US011750431B2

(12) United States Patent
Ly et al.

(10) Patent No.: US 11,750,431 B2
(45) Date of Patent: Sep. 5, 2023

(54) PEAK REDUCTION TONES FOR FULL DUPLEX COMMUNICATION

(71) Applicant: QUALCOMM Incorporated, San Diego, CA (US)

(72) Inventors: Hung Dinh Ly, San Diego, CA (US); Saeid Sahraei, San Diego, CA (US); Muhammad Sayed Khairy Abdelghaffar, San Jose, CA (US); Renqiu Wang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/305,274

(22) Filed: Jul. 2, 2021

(65) Prior Publication Data
US 2022/0070039 A1 Mar. 3, 2022

Related U.S. Application Data

(60) Provisional application No. 63/072,836, filed on Aug. 31, 2020.

(51) Int. Cl.
*H04L 27/26* (2006.01)
*H04L 5/00* (2006.01)
*H04L 5/14* (2006.01)

(52) U.S. Cl.
CPC ........ *H04L 27/2614* (2013.01); *H04L 5/0012* (2013.01); *H04L 27/2607* (2013.01); *H04L 5/1423* (2013.01)

(58) Field of Classification Search
CPC .. H04L 5/0012; H04L 27/2607; H04L 5/1423
See application file for complete search history.

(56) References Cited

U.S. PATENT DOCUMENTS

2008/0298316 A1* 12/2008 Bitran ................. H04L 27/2614
370/329
2010/0008442 A1* 1/2010 Hellberg ............. H04L 27/2618
375/267
(Continued)

OTHER PUBLICATIONS

Bai J., et al., "Full-duplex in 5G Small Cell Access: System Design and Performance Aspects," arXiv: 1903.09893v1 [eess.SP], Mar. 23, 2019 (Mar. 23, 2019), pp. 1-7, XP055757462, Retrieved from the Internet: URL: https://arxiv.org/pdf/1903.09893.pdf. [Retrieved on Dec. 7, 2020] abstract, the whole document.
(Continued)

*Primary Examiner* — Samina F Choudhry
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, information indicating at least one of a first set of peak reduction tones (PRTs) for uplink communication, or a second set of PRTs for downlink communication, for use in a full-duplex communication mode. The first set of PRTs and the second set of PRTs may share at least one PRT. The UE may transmit, to the base station, or receive, from the base station, at least one signal based at least in part on the at least one of the first set of PRTs or the second set of PRTs. Numerous other aspects are provided.

30 Claims, 15 Drawing Sheets

(56) References Cited

U.S. PATENT DOCUMENTS

2011/0194544 A1* 8/2011 Yang .................. H04L 27/2621
    370/338
2018/0048436 A1* 2/2018 Park .................. H04W 52/146
2018/0278452 A1 9/2018 Yang et al.

OTHER PUBLICATIONS

Dahlman E., et al., "LTE Radio Access: An Overview (Chapter 7)" In: "4G: LTE/LTE-Advanced for Mobile Broadband", Oct. 7, 2013 (Oct. 7, 2013), Elsevier, XP055172737, pp. 103-119, figure 7.3.
Hu S., et al., "Nonlinearity Reduction by Tone Reservation with Null Subcarriers for WiMAX System", Wireless Personal Communications, Kluwer Academic Publishers, DO, vol. 54, No. 2, Apr. 28, 2009 (Apr. 28, 2009), pp. 289-305, XP019832925, ISSN: 1572-834X, section 4.2.
International Search Report and Written Opinion—PCT/US2021/070825—ISA/EPO—dated Oct. 25, 2021.
Itsikiantsoa R., et al., "Distributed Resource Allocation in full-duplex Cellular Networks With Partial Spectrum Overlap", 2018 IEEE Wireless Communications and Networking Conference (WCNC), IEEE, Apr. 15, 2018 (Apr. 15, 2018), pp. 1-6, XP033355343, DOI: 10.1109/WCNC.2018.8377348, [Retrieved on Jun. 8, 2018], Abstract.
Rakshith R., et al., "Multicarrier Division Duplex Aided Millimeter Wave Communications", IEEE Access, vol. 7, Aug. 9, 2019 (Aug. 9, 2019), pp. 100719-100732, XP011738580, 15 Pages, DOI: 10.1109/ACCESS.2019.2930333, [Retrieved on Aug. 6, 2019] Abstract.

* cited by examiner

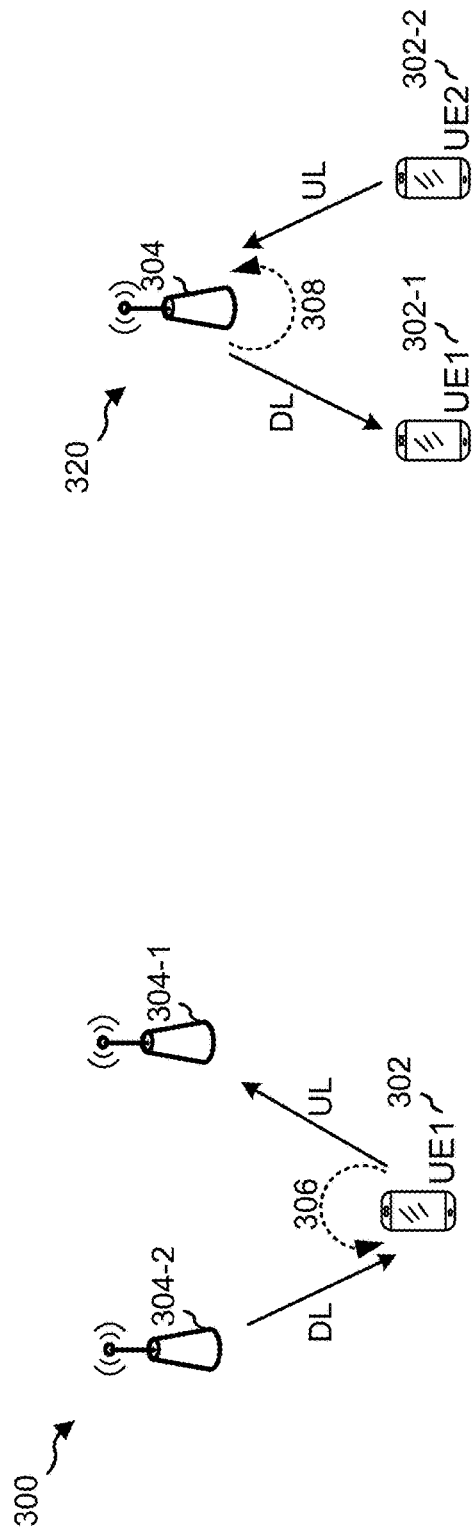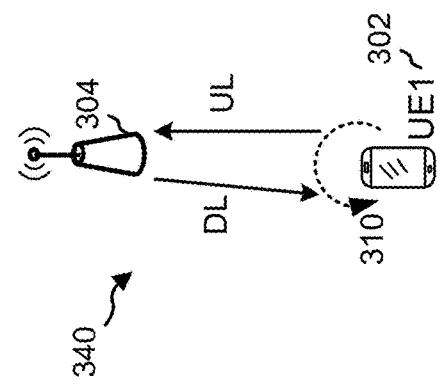
FIG. 3B
FIG. 3C
FIG. 3A

PEAK REDUCTION TONES FOR FULL DUPLEX COMMUNICATION

CROSS-REFERENCE TO RELATED APPLICATION

This Patent Application claims priority to U.S. Provisional Patent Application No. 63/072,836, filed on Aug. 31, 2020, entitled "PEAK REDUCTION TONES FOR FULL DUPLEX COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for peak reduction tones (PRTs) for full duplex communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, information indicating at least one of a first set of peak reduction tones (PRTs) for uplink communication, or a second set of PRTs for downlink communication, for use in a full-duplex communication mode, where the first set of PRTs and the second set of PRTs share at least one PRT; and transmitting, to the base station, or receiving, from the base station, at least one signal based at least in part on the at least one of the first set of PRTs or the second set of PRTs.

In some aspects, a method of wireless communication performed by a base station includes transmitting, to a UE, information indicating at least one of a first set of PRTs for uplink communication, or a second set of PRTs for downlink communication, for use in a full-duplex communication mode, where the first set of PRTs and the second set of PRTs share at least one PRT; and transmitting, to the UE, or receiving, from the UE, at least one signal based at least in part on the at least one of the first set of PRTs or the second set of PRTs.

In some aspects, a UE for wireless communication includes a memory, and one or more processors, coupled to the memory, configured to: receive, from a base station, information indicating at least one of a first set of PRTs for uplink communication, or a second set of PRTs for downlink communication, for use in a full-duplex communication mode, where the first set of PRTs and the second set of PRTs share at least one PRT; and transmit, to the base station, or receive, from the base station, at least one signal based at least in part on the at least one of the first set of PRTs or the second set of PRTs.

In some aspects, a base station for wireless communication includes a memory, and one or more processors, coupled to the memory, configured to: transmit, to a UE, information indicating at least one of a first set of PRTs for uplink communication, or a second set of PRTs for downlink communication, for use in a full-duplex communication mode, where the first set of PRTs and the second set of PRTs share at least one PRT; and transmit, to the UE, or receive, from the UE, at least one signal based at least in part on the at least one of the first set of PRTs or the second set of PRTs.

In some aspects, a non-transitory computer-readable medium storing a set of instructions for wireless communication includes one or more instructions that, when executed by one or more processors of a UE, cause the UE to: receive, from a base station, information indicating at least one of a first set of PRTs for uplink communication, or a second set of PRTs for downlink communication, for use in a full-duplex communication mode, where the first set of PRTs and the second set of PRTs share at least one PRT; and transmit, to the base station, or receive, from the base station, at least one signal based at least in part on the at least one of the first set of PRTs or the second set of PRTs.

In some aspects, a non-transitory computer-readable medium storing a set of instructions for wireless communication includes one or more instructions that, when executed by one or more processors of a base station, cause the base station to: transmit, to a UE, information indicating at least one of a first set of PRTs for uplink communication, or a second set of PRTs for downlink communication, for use in a full-duplex communication mode, where the first set of PRTs and the second set of PRTs share at least one PRT; and transmit, to the UE, or receive, from the UE, at least one signal based at least in part on the at least one of the first set of PRTs or the second set of PRTs.

In some aspects, an apparatus for wireless communication includes means for receiving, from a base station, information indicating at least one of a first set of PRTs for uplink communication, or a second set of PRTs for downlink communication, for use in a full-duplex communication mode, where the first set of PRTs and the second set of PRTs share at least one PRT; and means for transmitting, to the base station, or receiving, from the base station, at least one signal based at least in part on the at least one of the first set of PRTs or the second set of PRTs.

In some aspects, an apparatus for wireless communication includes means for transmitting, to a UE, information indicating at least one of a first set of PRTs for uplink communication, or a second set of PRTs for downlink communication, for use in a full-duplex communication mode, where the first set of PRTs and the second set of PRTs share at least one PRT; and means for transmitting, to the UE, or receiving, from the UE, at least one signal based at least in part on the at least one of the first set of PRTs or the second set of PRTs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
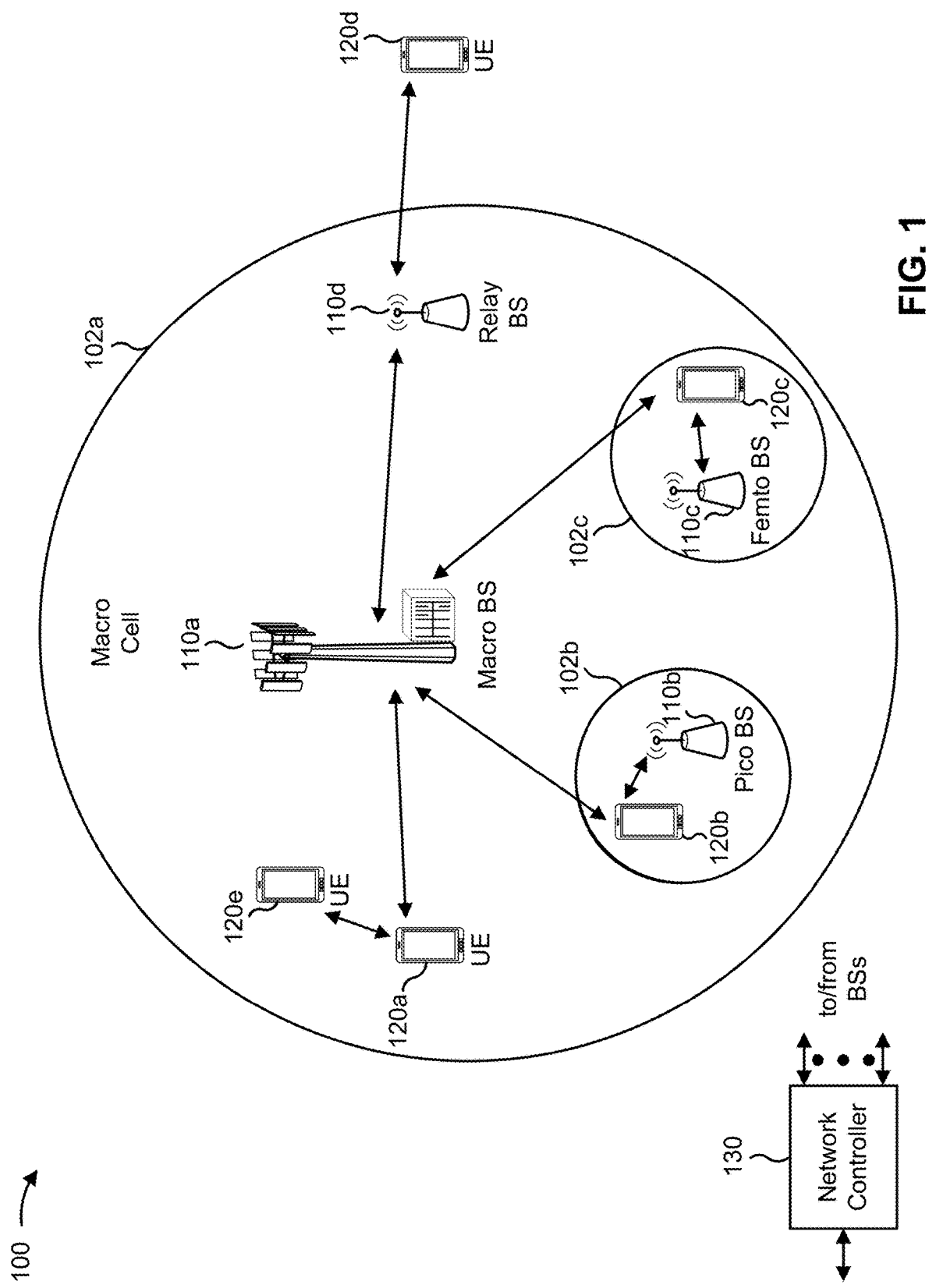
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V21) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
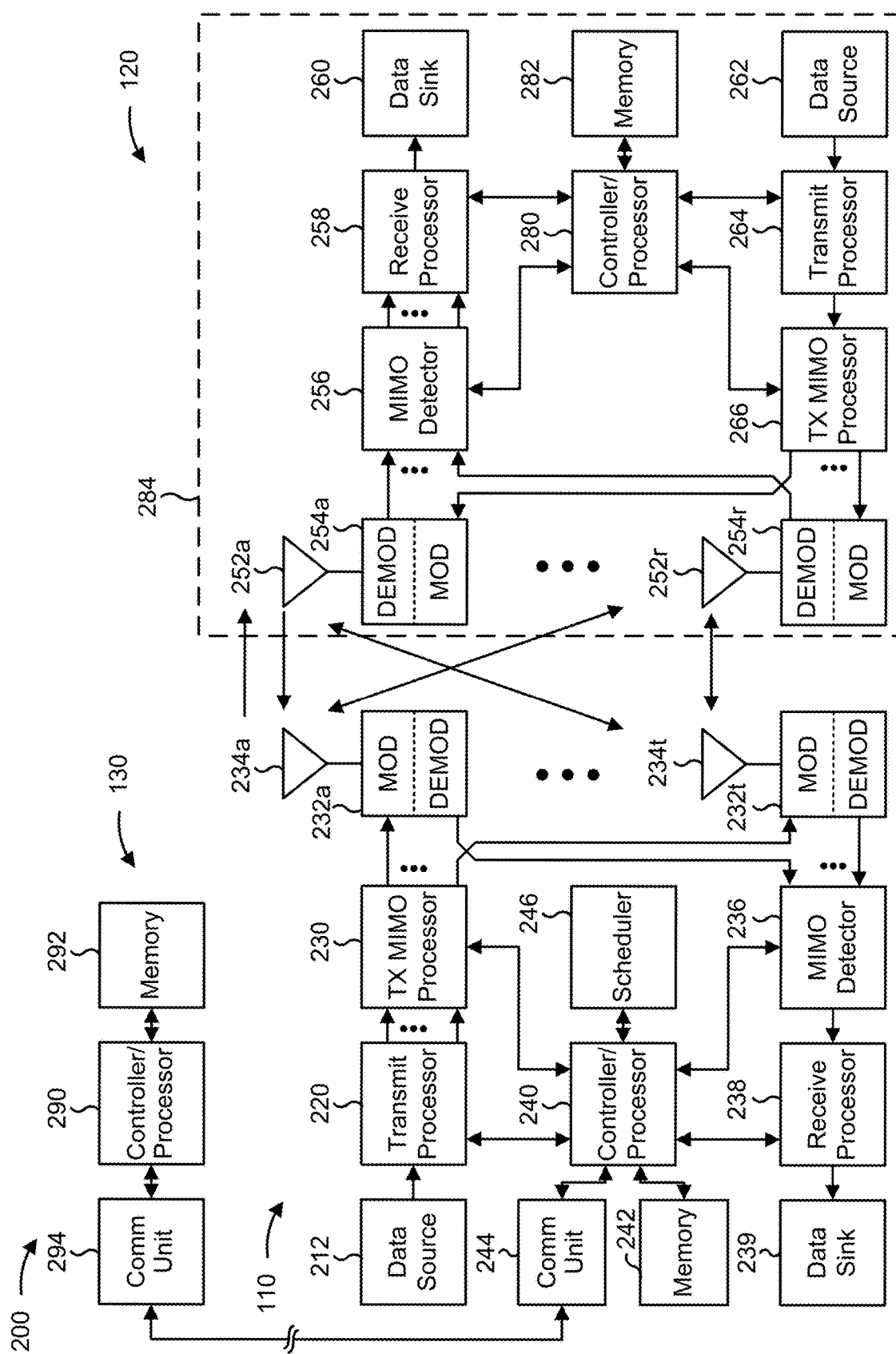
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-13).

Controller/processor 240 of base station 110, controller/processor 280 of UE 120, and/or any other component(s) of FIG. 2 may perform one or more techniques associated with PRTs for full-duplex communication, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 may include means for receiving, from a base station, information indicating, and/or determining, at least one of a first set of PRTs for uplink communication, or a second set of PRTs for downlink communication, for use in a full-duplex communication mode, where the first set of PRTs and the second set of PRTs share at least one PRT, means for transmitting, to the base station, or receiving, from the base station, at least one signal based at least in part on the at least one of the first set of PRTs or the second set of PRTs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, information indicating, and/or determining, at least one of a first set of PRTs for uplink communication, or a second set of PRTs for downlink communication, for use in a full-duplex communication mode, where the first set of PRTs and the second set of PRTs share at least one PRT, means for transmitting, to the UE, or receiving, from the UE, at least one signal based at least in part on the at least one of the first set of PRTs or the second set of PRTs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A-3C are diagrams illustrating examples 300, 320, 340 of full duplex (FD) communication, in accordance with the present disclosure. FD communication may include contemporaneous uplink and downlink communications. For example, the uplink and downlink communications may at least partially overlap in time.

The example 300 of FIG. 3A includes a UE1 302 and two base stations (e.g., TRPs) 304-1, 304-2, where the UE1 302 is sending a UL transmission to the base station 304-1 and is receiving a DL transmission from the base station 304-2. In the example 300 of FIG. 3A, FD is enabled for the UE1 302, and FD is not enabled for the base stations 304-1, 304-2 (e.g., half duplex (HD) communication is enabled for the base stations 304-1, 304-2). Moreover, as shown by reference number 306, the UL transmission to the base station 304-1 may self-interfere with the DL transmission from the base station 304-2. This may be caused by a variety of factors, such as the transmit power used for the UL transmission (as compared to the DL transmission), radio frequency bleeding, and/or the like.

The example 320 of FIG. 3B includes two UEs, UE1 302-1 and UE2 302-2, and a base station 304, where the UE1 302-1 is receiving a DL transmission from the base station 304 and the UE2 302-2 is transmitting a UL transmission to the base station 304. In the example 320 of FIG. 3B, FD is enabled for the base station 304, and FD is not enabled for the UE1 302-1 and the UE2 302-2 (e.g., HD communication is enabled for the UE1 302-1 and the UE2 302-2). Moreover, as shown by reference number 308, the DL transmission from the base station 304 to the UE1 302-1 may self-interfere with the UL transmission from the UE2 302-2 to the base station 304.

The example 340 of FIG. 3C includes a UE1 302 and a base station 304, where the UE1 302 is receiving a DL transmission from the base station 304 and the UE1 302 is transmitting a UL transmission to the base station 304. In the example 340 of FIG. 3C, FD is enabled for both the UE1 302 and the base station 304. Moreover, as shown by reference number 310, the UL transmission to the base station 304 may self-interfere with the DL transmission from the base station 304.

Accordingly, while FD communication may double an available bandwidth, it may present challenges for managing, suppressing, or canceling self-interference. Interference in FD communication may be the result of other causes as well, such as clutter echo, inter-operator or intra-operator interference (e.g., base station to base station interference or UE to UE interference), and/or the like.

As indicated above, FIGS. 3A-3C are provided as examples. Other examples may differ from what is described with regard to FIGS. 3A-3C.

Figure 4B:
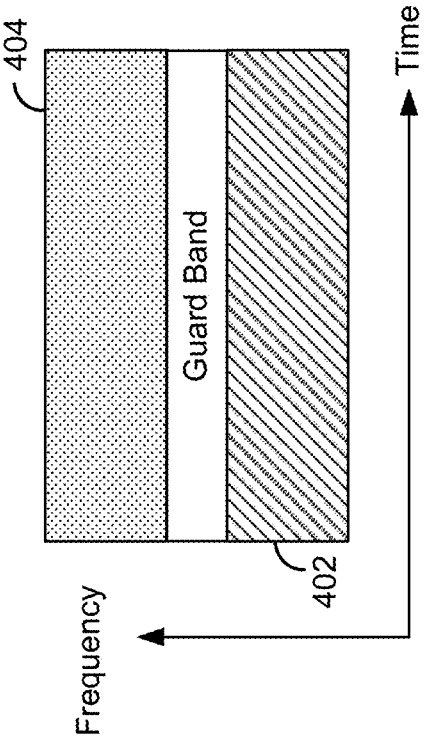
FIGS. 4A-4C are diagrams illustrating various duplexing modes in a radio access network, in accordance with the present disclosure.
Figure 4A:
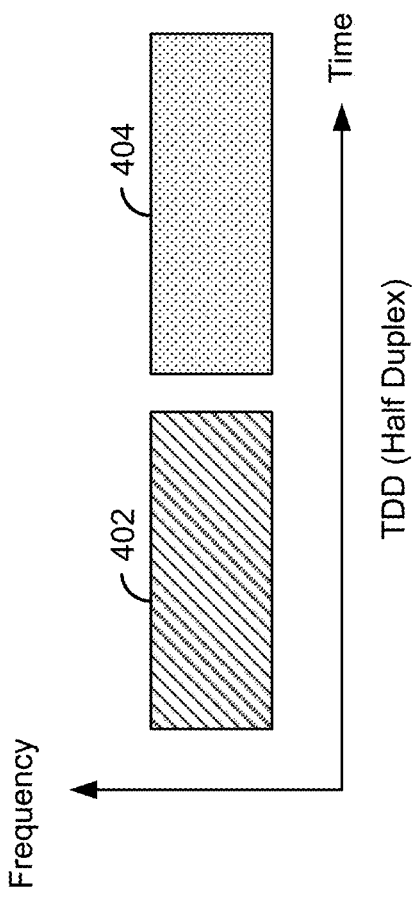
Figure 4C:
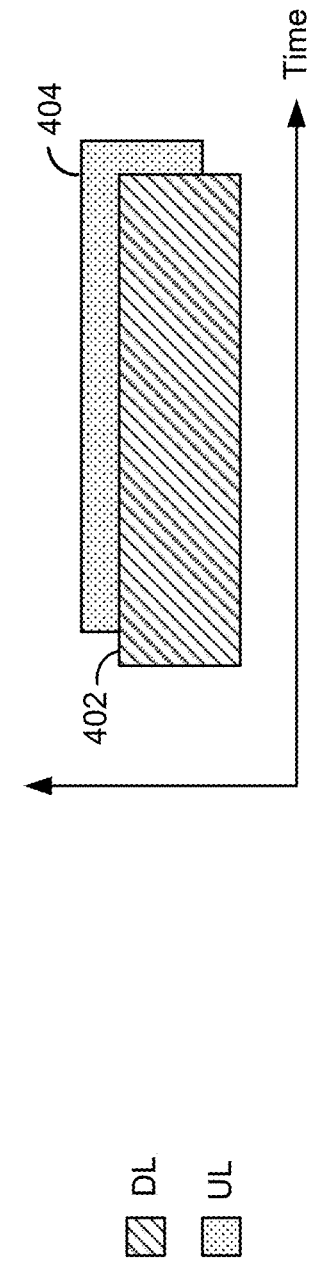

FIGS. 4A-4C are diagrams illustrating various duplexing modes in a radio access network, in accordance with the present disclosure. FIG. 4A depicts a time division duplexing (TDD) mode of communication between a UE and a base station. In TDD, only one endpoint (e.g., one of a UE or a base station) may send information to another end point (e.g., the other of the UE or the base station) at a time. For example, in TDD, transmissions in different directions on a given channel are separated from one another using time division multiplexing. That is, at some times the channel is dedicated for transmissions in one direction, while at other times the channel is dedicated for transmissions in the other direction. In some cases, the direction may change rapidly, such as several times per slot. Thus, as illustrated in FIG. 4A, DL communications 402 are separated from UL communications 404 in time.

FIG. 4B depicts a frequency division duplexing (FDD) mode of communication between a UE and a base station. FDD may be used in unpaired spectrum. In FDD, both endpoints may simultaneously communicate with one another on different frequencies (e.g., different frequency bands, sets of sub-carriers, resource blocks, and/or the like). In the FDD mode, as shown in FIG. 4B, transmissions in different directions operate at different carrier frequencies. Thus, as illustrated in FIG. 4B, DL communications 402 are separated from UL communications 404 in frequency, shown as a guard band. In some cases, FDD may be referred to as full duplex because a wireless communication device may be capable of transmitting and receiving at the same time, where transmission uses a first frequency and reception uses a second frequency. Because simultaneous transmission and reception by a device in FDD use different frequencies, this FD mode may be referred to as sub-band FD.

Sub-band FD may provide an intermediate step between TDD and true FD, described below. In sub-band FD, a slot may include one or more DL sub-bands and one or more UL sub-bands of a system bandwidth. Compared to TDD, sub-band FD may reduce latency, provide greater uplink coverage, and/or the like. However, sub-band FD may also result in interference (e.g., self-interference), as described above. In some cases, self-interference may be mitigated by a guard band between an UL sub-band and a DL sub-band, as described above. Furthermore, a guard band may be used to reduce a peak to average power ratio (PAPR) of a waveform (e.g., for DL or UL), as described below in connection with FIG. 5. As a result, the waveform may be associated with reduced non-linearity, thereby reducing self-interference.

FIG. 4C depicts a true FD mode of communication between a UE and a base station. In the true FD mode, as shown in FIG. 4C, transmissions in different directions operate at the same carrier frequency or within overlapping bandwidths. In the example shown in FIG. 4C, DL communications 402 overlap (e.g., partially or fully) UL communications 404 in both time and frequency. Thus, when operating in a true FD mode, the UE and base station are configured for concurrent transmission and reception within an overlapping bandwidth. That is, simultaneous transmission and reception by a device in this mode can use the same frequency. As a result, this FD mode may be referred to as in-band FD.

As indicated above, FIGS. 4A-4C are provided as examples. Other examples may differ from what is described with respect to FIGS. 4A-4C.

Figure 5:
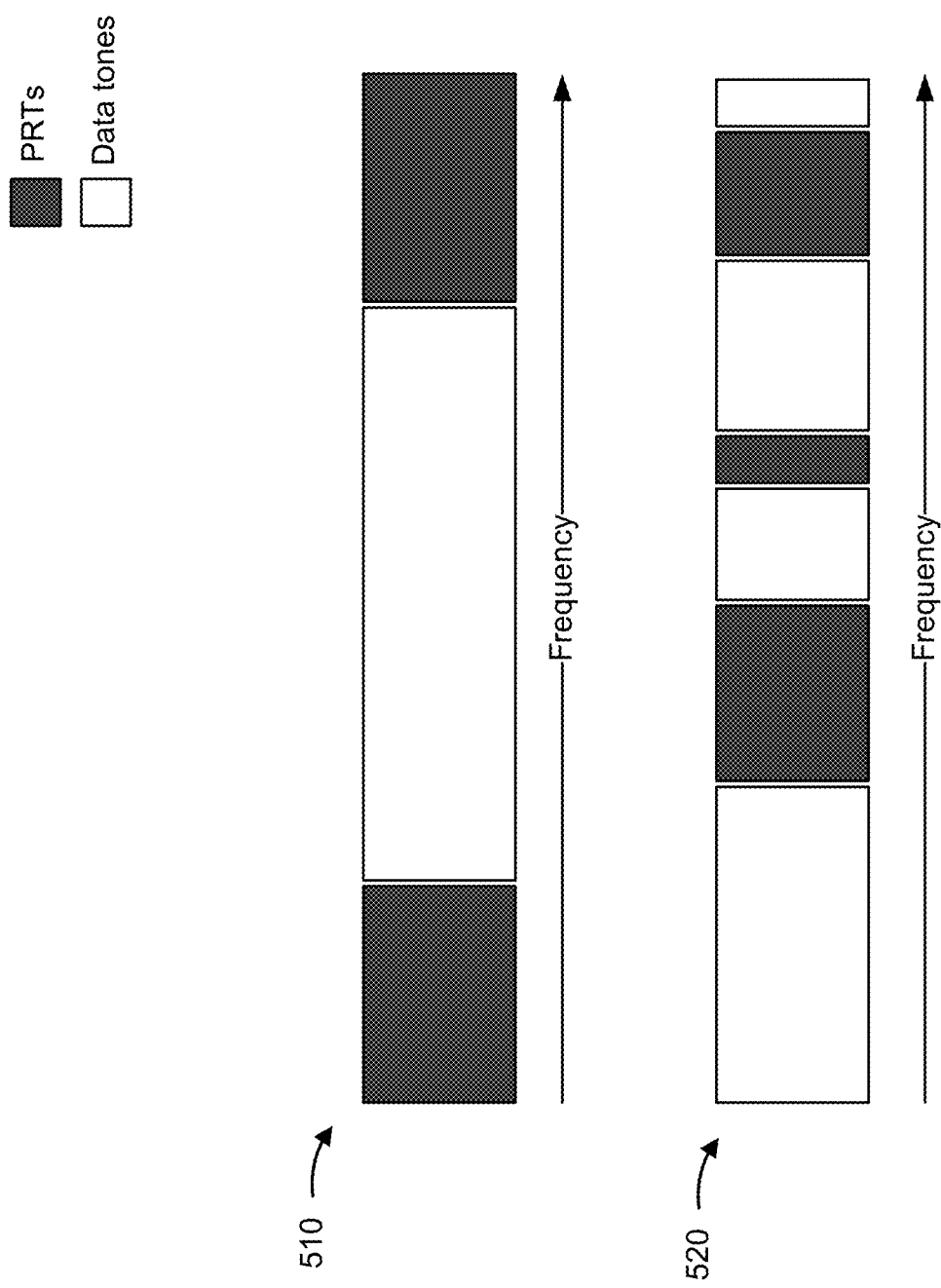
FIG. 5 is a diagram illustrating examples of tone reservation, in accordance with the present disclosure.

FIG. 5 is a diagram illustrating examples of tone reservation, in accordance with the present disclosure.

Commercial power amplifiers typically have a non-linear behavior if operated at high input power. This non-linearity may result in in-band and out-of-band distortion of the signal, and degraded error vector magnitude (EVM) at a receiver of the signal. To avoid non-linearity, the power amplifier may be operated at a mean input power that is several decibels (dB) lower than the saturation point. An appropriate power level may be determined by determining an input power that maintains a PAPR of the signal below a certain level.

Orthogonal frequency division multiplexing (OFDM) signals are known to suffer from significant PAPR that grows rapidly by the size of the frequency block. 5G NR is being developed to support higher data rates than LTE. Thus, 5G NR OFDM block sizes may be larger than LIE block sizes, thereby further increasing PAPR of signals Some PAPR reduction techniques may be data-dependent and computationally expensive, making them unfit for a real-time implementation in the context of a 5G NR transmitter. As a result, clipping and filtering (CF) is often used in the industry. CF results in in-band distortion and often does not converge to a desirable solution.

5G NR provides an abundance of bandwidth both in the uplink and downlink This is true both due to the addition of Frequency Range 2 (FR2) in 5G NR as well as an increase in the available bandwidth to 100 MHz in the Sub-6 GHz frequency range. This excess bandwidth is partially exploited by using longer OFDM symbols, which further increases the PAPR for OFDM. The excess bandwidth may also be exploited for PAPR reduction via a technique known as tone reservation.

Tone reservation may allow a transmitter to utilize some of the otherwise-idle tones for reducing the PAPR of an OFDM signal Tone reservation is a distortion-less PAPR reduction technique that modifies the time-domain characteristic of a signal by optimizing values of the reserved tones (which may be referred to as peak reduction tones). Thus, the magnitude and the phase of the reserved tones may be optimized for a given OFDM symbol to minimize the PAPR of the associated signal. In some cases, there may be no overlap between the data tones and reserved tones. In this way, tone reservation may be used without introducing any EVM or adjacent channel leakage ratio.

At the receiver, portions of the signal associated with the reserved tones may be ignored, and portions of the signal associated with the data tones may be decoded. Thus, while the amplitudes and phases of reserved tones are data dependent, the receiver needs only to know the location (e.g., sub-channel indices) of the reserved tones. In some cases, the locations of the reserved tones may be fixed according to a pseudo-random pattern (e.g., a Golomb ruler). In some aspects, a pattern for the location of reserved tones may be known to both a base station and a UE that are communicating.

As shown by reference number 510, the reserved tones may have a side-band location. That is, the reserved tones may be located at edge portions of a frequency band, and data tones may be located in a center portion of the frequency band between the edge portions. As shown by reference number 520, the reserved tones may have an in-band location. That is, the reserved tones and the data tones may be interleaved in a frequency band.

Tone reservation may be performed by determining PRTs that are configured to reduce peaks of the resulting OFDM signal so that the PAPR of the resulting signal satisfies a threshold. PRTs may be generated using a signal to clipping noise ratio tone reservation (SCR-TR) algorithm. The SCR-TR algorithm may be used to optimize the value of PRT tones based at least in part on their locations.

Wireless networks may generally lack support for techniques to signal, configure, indicate, or otherwise enable tone reservation in FD communications. As a result, FD communications may lack sufficient PAPR reduction, thereby resulting in self-interference, distortion, and/or the like, which may adversely affect a performance of the FD communications.

Some techniques and apparatuses described herein may facilitate PRT reservation in FD communications for reducing PAPR of a power amplifier in a UE or a base station. In particular, a first set of PRTs may be reserved for uplink communication (e.g., in an uplink sub-band) and a second set of PRTs may be reserved for downlink communication (e.g., in a downlink sub-band). In some aspects, the first set of PRTs and the second set of PRTs may share at least one PRT. For example, the shared PRT(s) may be in a guard band between an uplink sub-band and a downlink sub-band. As another example, the shared PRT(s), for in-band FD, may be in overlapping uplink and downlink frequency resources. In some aspects, PRT locations for HD communication may be based at least in part on the first set of PRTs and the second set of PRTs used for FD communication. In this way, PAPR reduction in FD communication may be improved, thereby reducing self-interference, distortion, and/or the like, and improving a performance of FD communications.

As indicated above, FIG. 5 is provided as an example. Other examples may differ from what is described with respect to FIG. 5.

Figure 6:
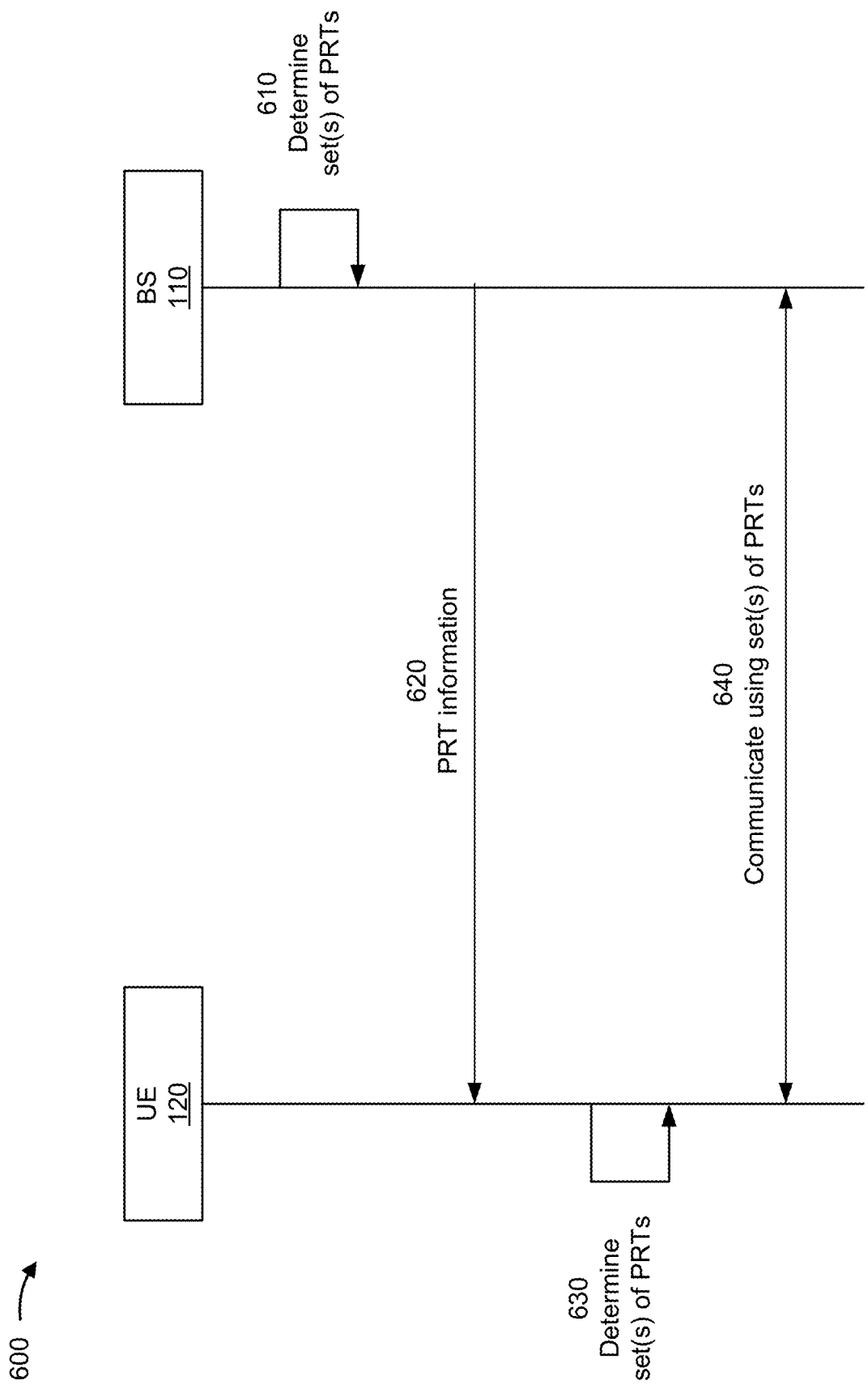
FIGS. 6-11 are diagrams illustrating examples associated with PRTs for full-duplex communication, in accordance with the present disclosure.

FIG. 6 is a diagram illustrating an example 600 associated with PRTs for FD communication, in accordance with the present disclosure. As shown in FIG. 6, example 600 includes communications between a base station 110 and a UE 120. In some aspects, the base station 110 and the UE 120 may be included in a wireless network, such as wireless network 100. The base station 110 and the UE 120 may communicate on a wireless access link, which may include an uplink and a downlink In some aspects, the base station 110 and/or the UE 120 may communicate in an FD communication mode, as described above. For example, the base station 110 may configure the UE 120 (e.g., in a slot format indication) to communicate in one or more FD slots, such as sub-band FD slots or in-band FD slots, as described above. References to "slots" herein may refer to a time interval, which may be a slot, a mini-slot, a symbol, a subframe, a frame, or another transmission time interval.

As shown by reference number 610, the base station 110 may determine one or more sets of PRTs. For example, the base station 110 may determine a plurality of sub-channels that are to be reserved for a set of PRTs. In some aspects, the base station 110 may determine a set of PRTs (e.g., a first set of PRTs) for uplink communication (which may be referred to as a set of uplink PRTs) and a set of PRTs (e.g., a second set of PRTs) for downlink communication (which may be referred to as a set of downlink PRTs), which are for use in an FD communication mode (e.g., for use in FDD), as described below in FIGS. 7 and 8. In some aspects, the base station 110 may determine an additional set of uplink PRTs and/or an additional set of downlink PRTs for use in uplink and downlink transmission hopping (e.g., frequency hopping), as described below in FIG. 9. In some aspects, the base station 110 may determine a supplemental set of uplink PRTs and/or a supplemental set of downlink PRTs for use in an HD communication mode (e.g., for use in TDD), as described below in FIGS. 10 and 11.

As shown by reference number 620, the base station 110 may transmit, and the UE 120 may receive, PRT information indicating one or more sets of PRTs determined by the base station 110. In some aspects, the PRT information may indicate the set of uplink PRTs and/or the set of downlink PRTs for use in FD communication. In some aspects, the PRT information may indicate the additional set of uplink PRTs and/or the additional set of downlink PRTs for use in frequency hopping. In some aspects, the PRT information may indicate the supplemental set of uplink PRTs and/or the supplement set of downlink PRTs for use in HD communication.

In some aspects, a set of PRTs may indicate a sequence of PRTs. For example, the set of uplink PRTs may indicate a sequence of PRTs for uplink communication, and the set of downlink PRTs may indicate a sequence of PRTs for downlink communication. A sequence of PRTs may identify locations of the PRTs by reference to sub-channel indices that are reserved for the PRTs.

In some aspects, the PRT information may indicate a set of sub-channel indices for a set of PRTs. For example, the PRT information may indicate a set of sub-channel indices in an uplink sub-band and/or a guard band for the set of uplink PRTs, and indicate a set of sub-channel indices in a downlink sub-band and/or a guard band for the set of downlink PRTs. In some aspects, the PRT information may indicate a pattern, a set of rules, and/or the like, for determining a set of PRTs. In this case, the UE 120 may determine the sub-channel indices that are to be reserved for the PRTs using the pattern, the set of rules, and/or the like. For example, the PRT information may indicate a set of rules for determining an additional set of PRTs or a supplemental set of PRTs, as described above, based at least in part on the set of uplink PRTs and/or the set of downlink PRTs.

In some aspects, the PRT information may be included in a semi-static configuration or a dynamic configuration transmitted by the base station 110. For example, the base station 110 may transmit the PRT information via radio resource control (RRC) signaling, a medium access control control element (MAC-CE), downlink control information (DCI), and/or the like. In some aspects, the UE 120 and the base station 110 may be statically configured, or otherwise provisioned, with the PRT information.

As shown by reference number 630, the UE 120 may determine one or more sets of PRTs. For example, the UE 120 may determine a plurality of sub-channels that are to be reserved for a set of PRTs. The UE 120 may determine the one or more sets of PRTs based at least in part on the PRT information transmitted by the base station 110. For example, the UE 120 may determine the set of uplink PRTs and the set of downlink PRTs based at least in part on sub-channel indices indicated by the base station 110, a pattern indicated by the base station 110, a set of rules indicated by the base station 110, and/or the like. In some aspects, the UE 120 may determine the set of uplink PRTs and the set of downlink PRTs based at least in part on a static configuration for the UE 120 (e.g., the UE 120 may determine the set of uplink PRTs and the set of downlink PRTs without an indication from the base station 110). For example, the static configuration may identify sub-channel indices for a set of PRTs, a pattern for a set of PRTs, a set of rules for determining a set of PRTs, and/or the like.

In some aspects, the UE 120 may determine the set of uplink PRTs and/or the set of downlink PRTs, which are for use in an FD communication mode (e.g., for use in FDD), as described below in FIGS. 6 and 7. In some aspects, the UE 120 may determine the additional set of uplink PRTs and/or the additional set of downlink PRTs for use in uplink and downlink frequency hopping, as described below in FIG. 9. In some aspects, the UE 120 may determine the supplemental set of uplink PRTs and/or the supplemental set of downlink PRTs for use in an HD communication mode (e.g., for use in TDD), as described below in FIGS. 10 and 11.

As described above, the set of uplink PRTs and the set of downlink PRTs may be for use in FD communication. For example, the set of uplink PRTs and the set of downlink PRTs may be used to generate a signal and/or decode a signal in an FD slot (e.g., a sub-band FD slot or an in-band FD slot). In some aspects, the set of uplink PRTs and the set of downlink PRTs may share at least one PRT. The shared PRT(s) may be used to generate an uplink signal and/or a downlink signal in an FD communication mode.

As shown by reference number 640, the base station 110 and/or the UE 120 may communicate using one or more sets of PRTs. For example, the base station 110 and/or the UE 120 may perform FD communication based at least in part on the set of uplink PRTs and/or the set of downlink PRTs. As an example, the base station 110 may transmit a signal to the UE 120 (or another UE) using the set of downlink PRTs, and/or receive (e.g., concurrently) a signal from the UE 120 (or another UE) using the set of uplink PRTs. As another example, the UE 120 may transmit a signal to the base station 110 (or another base station, TRP, and/or the like) using the set of uplink PRTs, and/or receive (e.g., concurrently) a signal from the base station 110 (or another base station, TRP, and/or the like) using the set of downlink PRTs.

In some aspects, a transmitter, such as the base station 110 and/or the UE 120, may generate a waveform based at least in part on a set of PRTs (and data tones). In some aspects, the waveform may include a CP-OFDM waveform. In some aspects, the waveform may include a DFT-s-OFDM waveform. In some aspects, the transmitter may determine values (e.g., amplitude, phase, and/or the like) for the set of PRTs such that a PAPR associated with the waveform satisfies a PAPR threshold. The transmitter may transmit a signal using the waveform.

In some aspects, a receiver, such as the base station 110 and/or the UE 120, may receive the signal The receiver may decode the waveform based at least in part on a set of PRTs (and data tones). For example, the receiver may ignore a portion of the signal associated with the set of PRTs (e.g., refrain from decoding the portion of the signal). In some aspects, the signal may be received at the receiver with a PAPR that satisfies a threshold PAPR.

As indicated above, FIG. 6 is provided as an example. Other examples may differ from what is described with respect to FIG. 6.

Figure 7:
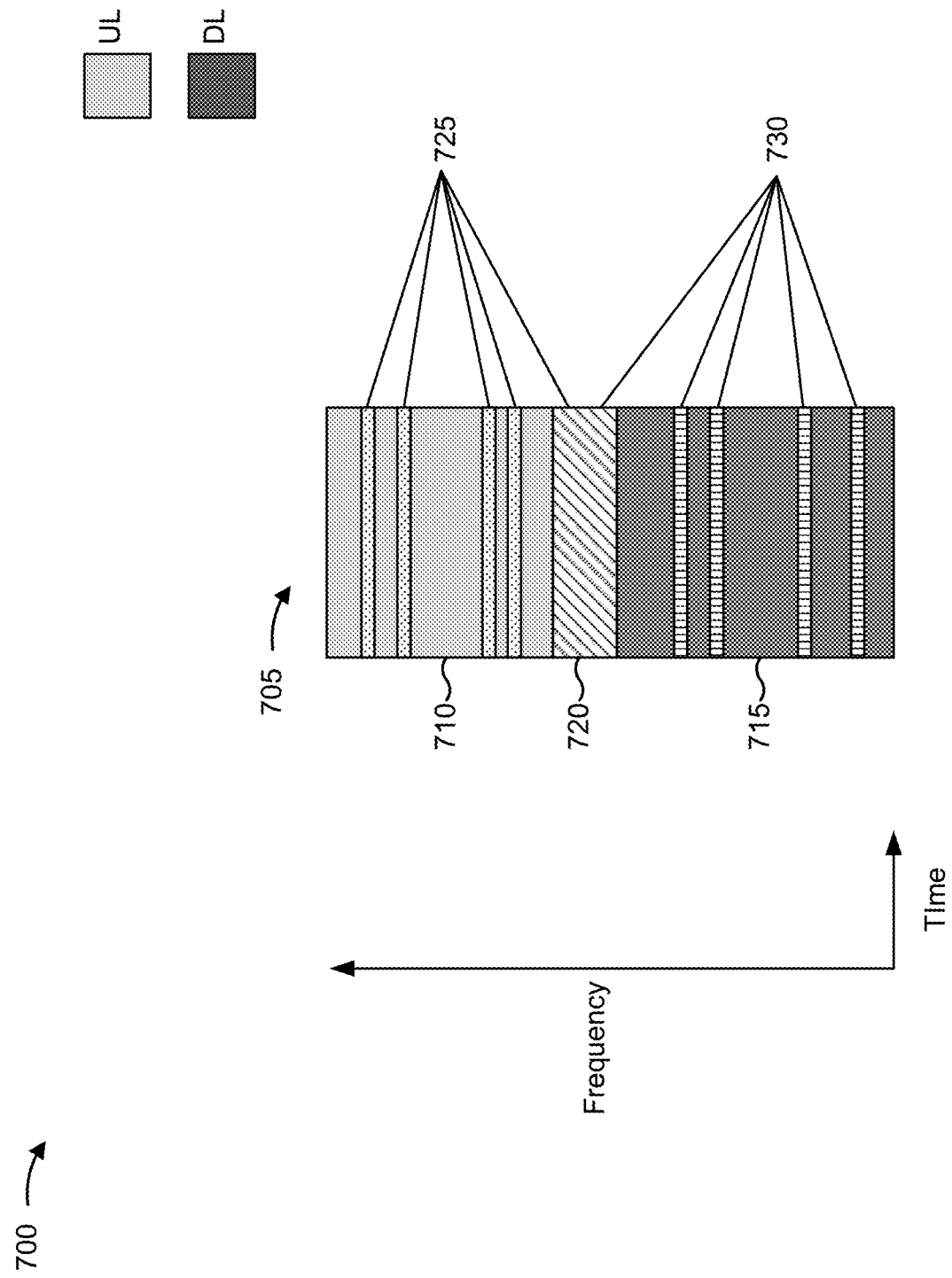

FIG. 7 is a diagram illustrating an example 700 associated with PRTs for FD communication, in accordance with the present disclosure. In some aspects, example 700 may include communications between a base station 110 and a UE 120, as described above in connection with FIG. 6.

Reference number 705 shows an FD slot (e.g., a sub-band FD slot) that includes an uplink sub-band 710, a downlink sub-band 715, and a guard band 720 between the uplink sub-band 710 and the downlink sub-band 715. Example 700 also shows locations (e.g., sub-channel sequences) for PRTs, and the locations may be determined by the base station 110 and/or the UE 120, as described above.

In some aspects, a set of uplink PRTs 725 include one or more PRTs located in (e.g., reserved in) the uplink sub-band 710, and a set of downlink PRTs 730 include one or more PRTs located in (e.g., reserved in) the downlink sub-band 715. In some aspects, as shown, the set of uplink PRTs 725 and the set of downlink PRTs 730 share at least one PRT (shown by cross-hatching) in the guard band 720. The shared PRT(s) may be used for both uplink communication and downlink communication.

Accordingly, the UE 120 may transmit a signal using the set of uplink PRTs 725, and the base station 110 may transmit a signal using the set of downlink PRTs 730. Similarly, the UE 120 may decode a signal received from the base station 110 by ignoring the set of downlink PRTs 730, and the base station 110 may decode a signal received from the UE 120 by ignoring the set of uplink PRTs 725.

As indicated above, FIG. 7 is provided as an example. Other examples may differ from what is described with respect to FIG. 7.

Figure 8:
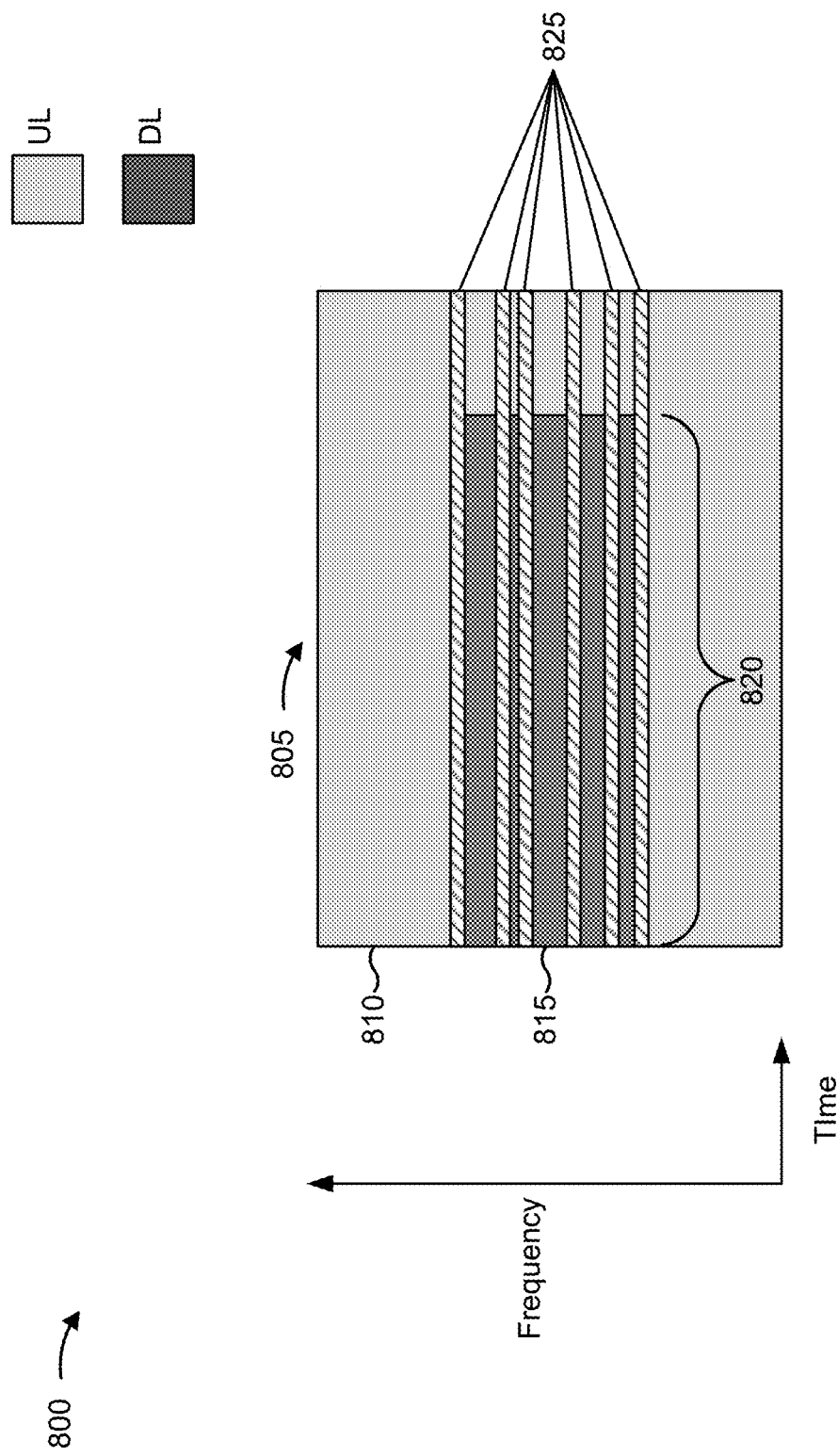

FIG. 8 is a diagram illustrating an example 800 associated with PRTs for FD communication, in accordance with the present disclosure. In some aspects, example 800 may include communications between a base station 110 and a UE 120, as described above in connection with FIG. 6.

Reference number 805 shows an FD slot (e.g., an in-band FD slot) that includes resources 810 for uplink communication and resources 815 for downlink communication that overlap in resources 820. That is, the resources 820 are shared for uplink communication and downlink communication in the FD slot 805. Example 800 also shows locations (e.g., sub-channel sequences) for PRTs, and the locations may be determined by the base station 110 and/or the UE 120, as described above.

In some aspects, as shown, a set of uplink PRTs and a set of downlink PRTs may be a same set of PRTs 825 (shown by cross-hatching). For example, the set of PRTs 825 may be located in (e.g., reserved in) the resources 820 shared for uplink communication and downlink communication in the FD slot 805. In other words, the set of PRTs 825 may be limited to overlapping resources 820 for uplink communication and downlink communication, and used for both uplink communication and downlink communication.

Accordingly, the UE 120 may transmit a signal using the set of PRTs 825, and the base station 110 may transmit a signal using the set of PRTs 825. Similarly, the UE 120 may decode a signal received from the base station 110 by ignoring the set of PRTs 825, and the base station 110 may decode a signal received from the UE 120 by ignoring the set of PRTs 825.

As indicated above, FIG. 8 is provided as an example. Other examples may differ from what is described with respect to FIG. 8.

Figure 9:
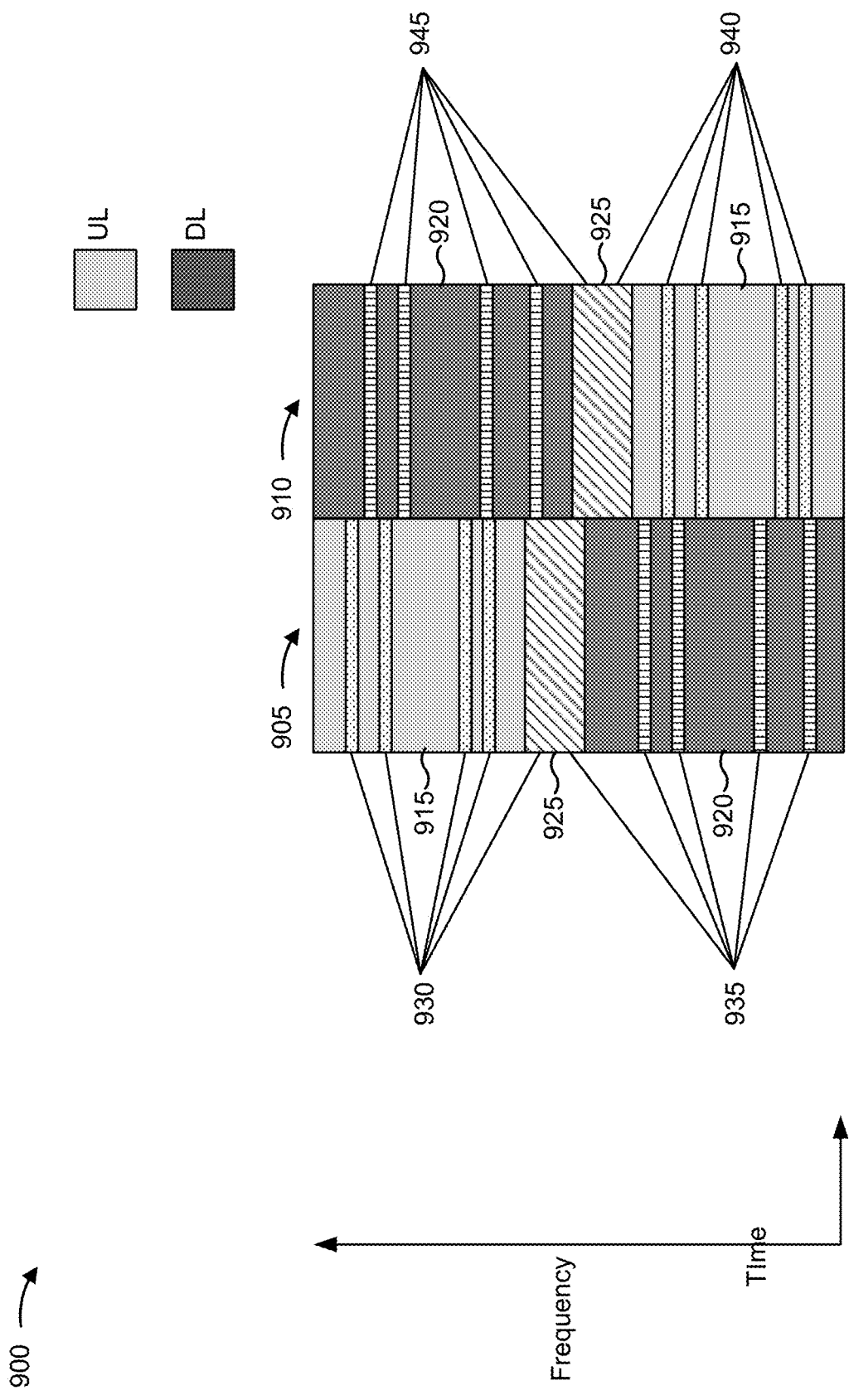

FIG. 9 is a diagram illustrating an example 900 associated with PRTs for FD communication, in accordance with the present disclosure. In some aspects, example 900 may include communication between a base station 110 and a UE 120, as described above in connection with FIG. 6.

Reference number 905 shows a first FD (e.g., sub-band FD) slot and reference number 910 shows a second FD (e.g., sub-band FD) slot. The first FD slot 905 and the second FD slot 910 may be sequential or may be separated by one or more slots. The first FD slot 905 and the second FD slot 910 may include an uplink sub-band 915, a downlink sub-band 920, and a guard band 925 between the uplink sub-band 915 and the downlink sub-band 920. The uplink sub-band 915 and the downlink sub-band 920 may frequency hop in the first FD slot 905 and the second FD slot 910. For example, in uplink frequency hopping, the uplink sub-band 915 may switch from a first frequency location in the first FD slot 905 to a second frequency location in the second FD slot 910. Similarly, in downlink frequency hopping, the downlink sub-band 920 may switch from a first frequency location in the first FD slot 905 to a second frequency location in the second FD slot 910. For example, as shown, the frequency locations of the uplink sub-bands 915, the downlink sub-bands 920, and the guard bands 925 in the first FD slot 905 and the second FD slot 910 may be inverses of each other.

In some aspects, the base station 110 may configure the frequency hopping in the first FD slot 905 and the second FD slot 910 for the UE 120. In some aspects, the configuration may be via RRC signaling, a MAC-CE, DCI, and/or the like. In some aspects, the configuration may indicate different bandwidths for one or more of the uplink sub-bands 915, the downlink sub-bands 920, and/or the guard bands 925 for different frequency hops.

Example 900 also shows locations (e.g., sub-channel sequences) for PRTs, and the locations may be determined by the base station 110 and/or the UE 120, as described above.

In some aspects, a set of uplink PRTs 930 (e.g., a first set of PRTs) may be located in the uplink sub-band 915 and/or the guard band 925 in the first FD slot 905, and a set of downlink PRTs 935 (e.g., a second set of PRTs) may be located in the downlink sub-band 920 and/or the guard band 925 in the first FD slot 905. In some aspects, an additional set of uplink PRTs 940 (e.g., a third set of PRTs) may be located in the uplink sub-band 915 and/or the guard band 925 in the second FD slot 910, and an additional set of downlink PRTs 945 (e.g., a fourth set of PRTs) may be located in the downlink sub-band 920 and/or the guard band 925 in the second FD slot 910.

In some aspects, the additional set of uplink PRTs 940 may be different (e.g., may identify different sub-channel indices) from the set of uplink PRTs 930, and the additional set of downlink PRTs 945 may be different from the set of downlink PRTs 935. For example, the set of uplink PRTs 930, the set of downlink PRTs 935, the additional set of uplink PRTs 940, and the additional set of downlink PRTs 945 may each indicate an arbitrary sequence of PRTs.

In some aspects, the additional set of uplink PRTs 940 may be frequency shifted relative to the set of uplink PRTs 930, and the additional set of downlink PRTs 945 may be frequency shifted relative to the set of downlink PRTs 935 (as shown in FIG. 9). In this case, an amount of frequency shift may correspond to a difference between a starting frequency of the uplink sub-band 915 in the first FD slot 905 and the second FD slot 910 or a difference between a starting frequency of the downlink sub-band 920 in the first FD slot 905 and the second FD slot 910. In some aspects, the additional set of uplink PRTs 940 may be mirrored in frequency relative to the set of uplink PRTs 930 with respect to a particular frequency, and the additional set of downlink PRTs 945 may be mirrored in frequency relative to the set of downlink PRTs 935 with respect to the particular frequency.

In some aspects, the additional set of uplink PRTs 940 in the second FD slot 910 may be based at least in part on the set of downlink PRTs 935 in the first FD slot 905. For example, the additional set of uplink PRTs 940 may be the same as the set of downlink PRTs 935, a subset of the set of downlink PRTs 935, a superset of the set of downlink PRTs 935, and/or the like. In some aspects, the additional set of downlink PRTs 945 in the second slot 910 may be based at least in part on the set of uplink PRTs 930 in the first slot 905 (e.g., may be the same as, a subset of, a superset of, and/or the like, the set of uplink PRTs 930).

Accordingly, the UE 120 may transmit a first signal in the first FD slot 905 using the set of uplink PRTs 930 and transmit a second signal in the second FD slot 910 using the additional set of uplink PRTs 940. The base station may transmit a first signal in the first FD slot 905 using the set of downlink PRTs 935 and transmit a second signal in the second FD slot 910 using the additional set of downlink PRTs 945. Similarly, the UE 120 may decode a first signal received from the base station 110 in the first FD slot 905 by ignoring the set of downlink PRTs 935, and decode a second signal received from the base station 110 in the second FD slot 910 by ignoring the additional set of downlink PRTs 945. The base station 110 may decode a first signal received from the UE 120 in the first FD slot 905 by ignoring the set of uplink PRTs 930, and decode a second signal received from the UE 120 in the second FD slot 910 by ignoring the additional set of uplink PRTs 940.

As indicated above, FIG. 9 is provided as an example. Other examples may differ from what is described with respect to FIG. 9.

Figure 10:
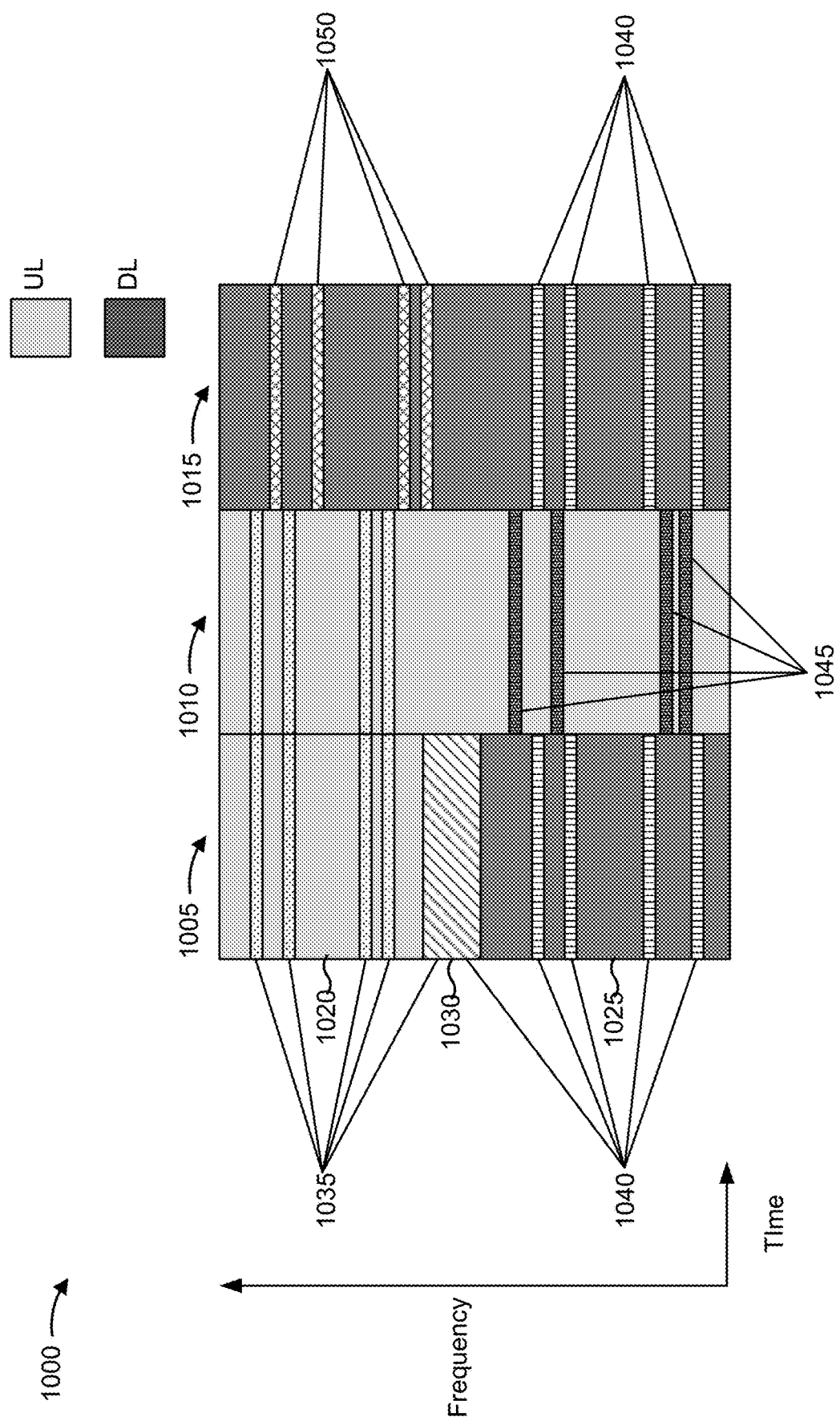

FIG. 10 is a diagram illustrating an example 1000 associated with PRTs for FD communication, in accordance with the present disclosure. In some aspects, example 1000 may include communications between a base station 110 and a UE 120, as described above in connection with FIG. 6.

Reference number 1005 shows an FD (e.g., sub-band FD) slot, reference number 1010 shows a UL-only HD slot, and reference number 1015 shows a DL-only HD slot. For example, a slot structure for the UE 120 may change dynamically between sub-band FD, UL-only, and DL-only. The FD slot 1005, the UL-only HD slot 1010, and the DL-only HD slot 1015 may be sequential, may be separated by one or more slots, or may occur in a different order than shown. The FD slot 1005 may include an uplink sub-band 1020, a downlink sub-band 1025, and a guard band 1030 between the uplink sub-band 1020 and the downlink sub-band 1025, as described above.

Example 1000 also shows locations (e.g., sub-channel sequences) for PRTs, and the locations may be determined by the base station 110 and/or the UE 120, as described above.

In some aspects, a set of uplink PRTs 1035 may be located in the uplink sub-band 1020 and/or the guard band 1030 in the FD slot 1005, and a set of downlink PRTs 1040 may be located in the downlink sub-band 1025 and/or the guard band 1030 in the FD slot 1005. In some aspects, the set of uplink PRTs 1035 (except for any PRTs in the guard band 1030, which is not included in an HD slot) also may be used for the UL-only HD slot 1010, and the set of downlink PRTs 1040 (except for any PRTs in the guard band 1030, which is not included in an HD slot) also may be used for the DL-only HD slot 1015. In some aspects, a supplemental set of uplink PRTs 1045 may be located in the UL-only HD slot 1010, and a supplemental set of downlink PRTs 1050 may be located in the DL-only HD slot 1015. For example, the supplemental set of uplink PRTs 1045 may be based at least in part on, or unrelated to, the set of downlink PRTs 1040, and the supplemental set of downlink PRTs 1050 may be based at least in part, or unrelated to, the set of uplink PRTs 1035. A supplemental set of PRTs may enable additional PAPR reduction in an HD slot.

Accordingly, the UE 120 may transmit a signal in the FD slot 1005 using the set of uplink PRTs 1035, and the base station 110 may transmit a signal in the FD slot 1005 using the set of downlink PRTs 1040. Similarly, the UE 120 may decode a signal received from the base station 110 in the FD slot 1005 by ignoring the set of downlink PRTs 1040, and the base station 110 may decode a signal received from the UE 120 in the FD slot 1005 by ignoring the set of uplink PRTs 1035. In the UL-only HD slot 1010, the UE 120 may transmit (e.g., in an HD communication mode) a signal using the set of uplink PRTs 1035 and/or the supplemental set of uplink PRTs 1045, and the base station 110 may decode the signal by ignoring the set of uplink PRTs 1035 and/or the supplemental set of uplink PRTs 1045. In the DL-only HD slot 1015, the base station 110 may transmit (e.g., in an HD communication mode) a signal using the set of downlink PRTs 1040 and/or the supplemental set of downlink PRTs 1050, and the UE 120 may decode the signal by ignoring the set of downlink PRTs 1040 and/or the supplemental set of downlink PRTs 1050.

As indicated above, FIG. 10 is provided as an example. Other examples may differ from what is described with respect to FIG. 10.

Figure 11:
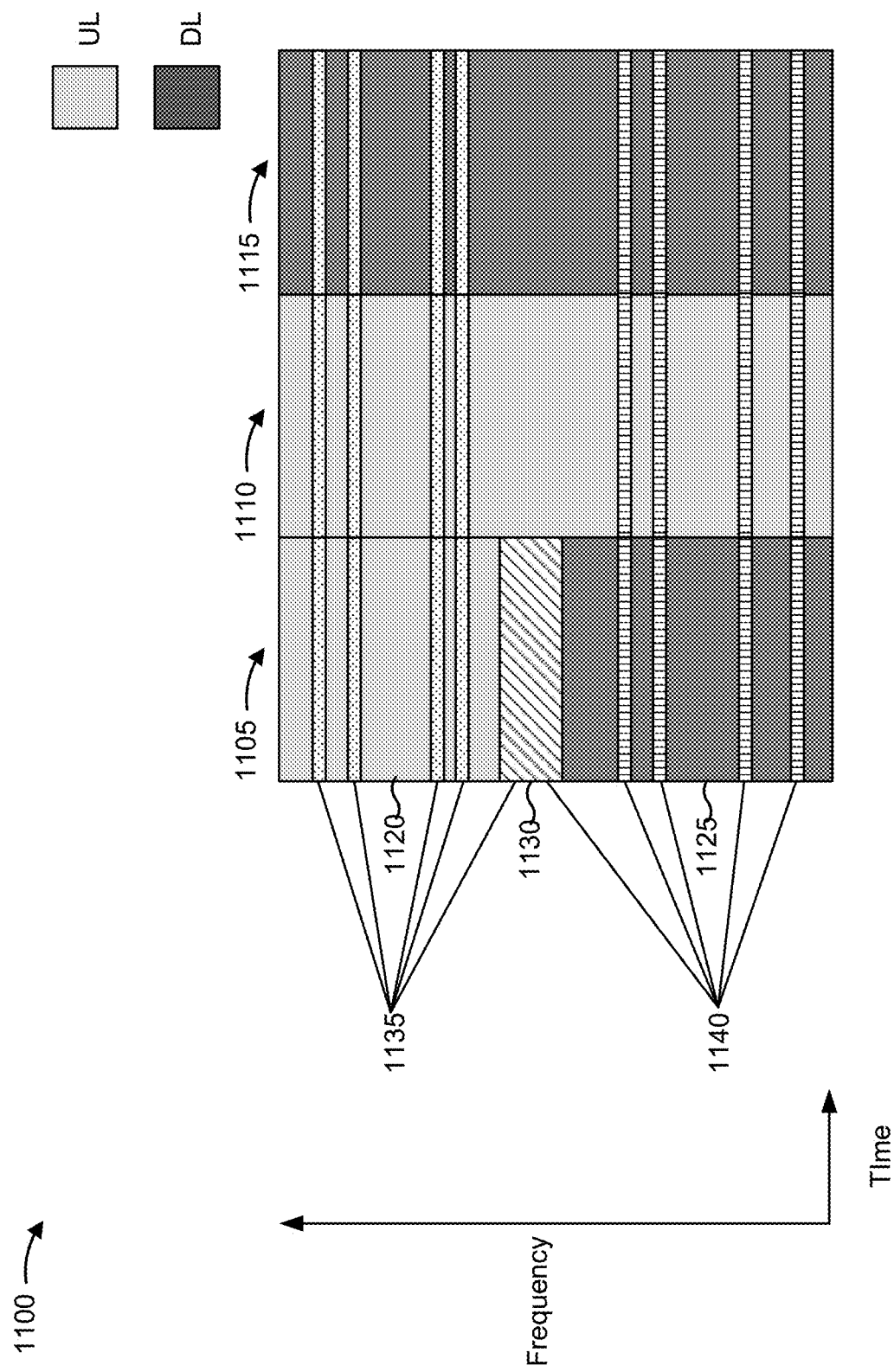

FIG. 11 is a diagram illustrating an example 1100 associated with PRTs for FD communication, in accordance with the present disclosure. In some aspects, example 1100 may include communications between a base station 110 and a UE 120, as described above in connection with FIG. 6.

Reference number 1105 shows an FD (e.g., sub-band FD) slot, reference number 1110 shows a UL-only HD slot, and reference number 1115 shows a DL-only HD slot, as described above. The FD slot 1105 may include an uplink sub-band 1120, a downlink sub-band 1125, and a guard band 1130 between the uplink sub-band 1120 and the downlink sub-band 1125, as described above.

Example 1100 also shows locations (e.g., sub-channel sequences) for PRTs, and the locations may be determined by the base station 110 and/or the UE 120, as described above.

In some aspects, a set of uplink PRTs 1135 may be located in the uplink sub-band 1120 and/or the guard band 1130 in the FD slot 1105, and a set of downlink PRTs 1140 may be located in the downlink sub-band 1125 and/or the guard band 1130 in the FD slot 1105. In some aspects, the set of uplink PRTs 1135 (except for any PRTs in the guard band 1130, which is not included in an HD slot) and the set of downlink PRTs 1140 (except for any PRTs in the guard band 1130, which is not included in an HD slot) may be used for the UL-only HD slot 1110. That is, the set of downlink PRTs 1140 may be re-purposed for the UL-only HD slot 1110. In some aspects, the set of uplink PRTs 1135 (except for any PRTs in the guard band 1130, which is not included in an HD slot) and the set of downlink PRTs 1140 (except for any PRTs in the guard band 1130, which is not included in an HD slot) may be used for the DL-only HD slot 1115. That is, the set of uplink PRTs 1135 may be re-purposed for the DL-only HD slot 1115.

Accordingly, the UE 120 may transmit a signal in the FD slot 1105 using the set of uplink PRTs 1135, and the base station 110 may transmit a signal in the FD slot 1105 using the set of downlink PRTs 1140. Similarly, the UE 120 may decode a signal received from the base station 110 in the FD slot 1105 by ignoring the set of downlink PRTs 1140, and the base station 110 may decode a signal received from the UE 120 in the FD slot 1105 by ignoring the set of uplink PRTs 1135. In the UL-only HD slot 1110, the UE 120 may transmit (e.g., in an HD communication mode) a signal using the set of uplink PRTs 1135 and the set of downlink PRTs 1140, and the base station 110 may decode the signal by ignoring the set of uplink PRTs 1135 and the set of downlink PRTs 1140. In the DL-only HD slot 1115, the base station 110 may transmit (e.g., in an HD communication mode) a signal using the set of uplink PRTs 1135 and the set of downlink PRTs 1140, and the UE 120 may decode the signal by ignoring the set of uplink PRTs 1135 and the set of downlink PRTs 1140.

As indicated above, FIG. 11 is provided as an example. Other examples may differ from what is described with respect to FIG. 11.

Figure 12:
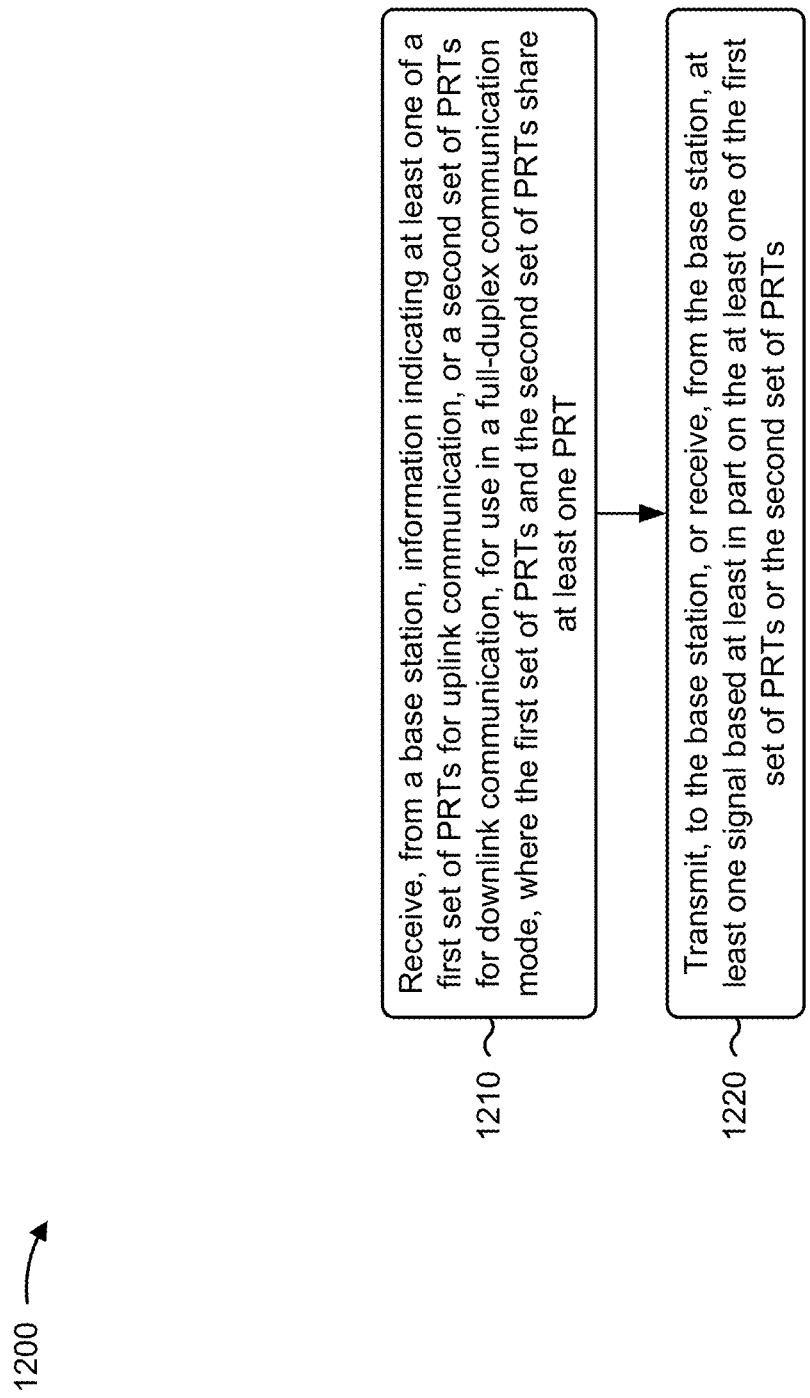
FIGS. 12 and 13 are diagrams illustrating example processes associated with PRTs for full-duplex communication, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with PRTs for FD communication.

As shown in FIG. 12, in some aspects, process 1200 may include receiving, from a base station, information indicating at least one of a first set of PRTs for uplink communication, or a second set of PRTs for downlink communication, for use in a full-duplex communication mode, where the first set of PRTs and the second set of PRTs share at least one PRT (block 1210). For example, the UE (e.g., using reception component 1402) may receive information indicating at least one of a first set of PRTs for uplink communication, or a second set of PRTs for downlink communication, for use in a full-duplex communication mode, as described above. In some aspects, the first set of PRTs and the second set of PRTs share at least one PRT.

As further shown in FIG. 12, in some aspects, process 1200 may include transmitting, to the base station, or receiving, from the base station, at least one signal based at least in part on the at least one of the first set of PRTs or the second set of PRTs (block 1220). For example, the UE (e.g., using antenna 252, DEMOD 254, MIMO detector 256, receive processor 258, reception component 1402, transmit processor 264, TX MIMO processor 266, MOD 254, transmission component 1404, controller/processor 280, and/or memory 282) may transmit, to a base station, or receive, from the base station, at least one signal based at least in part on the at least one of the first set of PRTs or the second set of PRTs, as described above.

Process 1200 may include additional aspects, such as any single aspect or any combination of aspects described below and/or in connection with one or more other processes described elsewhere herein.

In a first aspect, the first set of PRTs include one or more PRTs in an uplink sub-band for the full-duplex communication mode, and the second set of PRTs include one or more PRTs in a downlink sub-band for the full-duplex communication mode.

In a second aspect, alone or in combination with the first aspect, the at least one PRT is in a guard band between an uplink sub-band and a downlink sub-band for the full-duplex communication mode.

In a third aspect, alone or in combination with one or more of the first and second aspects, an uplink sub-band and a downlink sub-band, for the full-duplex communication mode, frequency hop in a first time interval and a second time interval.

In a fourth aspect, alone or in combination with one or more of the first through third aspects, transmitting or receiving the at least one signal includes transmitting or receiving a first signal in the first time interval based at least in part on the at least one of the first set of PRTs or the second set of PRTs, and transmitting or receiving a second signal in the second time interval based at least in part on at least one of a third set of PRTs for uplink communication or a fourth set of PRTs for downlink communication, where the third set of PRTs is different from the first set of PRTs, and the fourth set of PRTs is different from the second set of PRTs.

In a fifth aspect, alone or in combination with one or more of the first through fourth aspects, the third set of PRTs is frequency shifted relative to the first set of PRTs, and the fourth set of PRTs is frequency shifted relative to the second set of PRTs; or the third set of PRTs is mirrored in frequency relative to the first set of PRTs with respect to a particular frequency, and the fourth set of PRTs is mirrored in frequency relative to the second set of PRTs with respect to the particular frequency.

In a sixth aspect, alone or in combination with one or more of the first through fifth aspects, the fourth set of PRTs for downlink communication are based at least in part on the first set of PRTs for uplink communication, and the third set of PRTs for uplink communication are based at least in part on the second set of PRTs for downlink communication.

In a seventh aspect, alone or in combination with one or more of the first through sixth aspects, transmitting or receiving the at least one signal includes transmitting, in a half-duplex communication mode, an uplink signal based at least in part on the first set of PRTs, or receiving, in a half-duplex communication mode, a downlink signal based at least in part on the second set of PRTs.

In an eighth aspect, alone or in combination with one or more of the first through seventh aspects, the uplink signal is transmitted further based at least in part on a supplemental set of PRTs for uplink communication, or the downlink signal is received further based at least in part on a supplemental set of PRTs for downlink communication.

In a ninth aspect, alone or in combination with one or more of the first through eighth aspects, transmitting or receiving the at least one signal includes transmitting, in a half-duplex communication mode, an uplink signal based at least in part on the first set of PRTs and the second set of PRTs, or receiving, in a half-duplex communication mode, a downlink signal based at least in part on the first set of PRTs and the second set of PRTs.

In a tenth aspect, alone or in combination with one or more of the first through ninth aspects, the first set of PRTs and the second set of PRTs are a same set of PRTs.

In an eleventh aspect, alone or in combination with one or more of the first through tenth aspects, the same set of PRTs is in resources that are shared for uplink communication and downlink communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
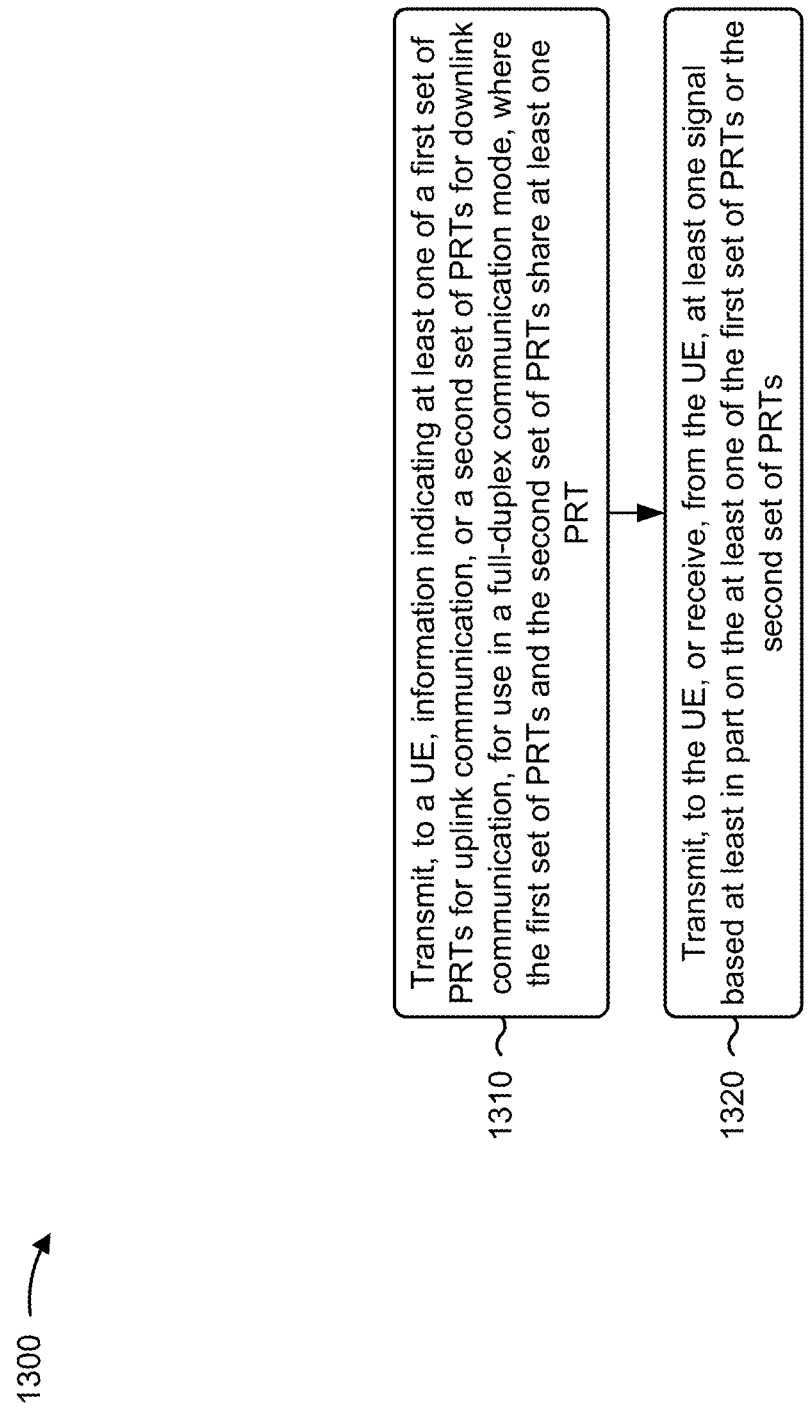

FIG. 13 is a diagram illustrating an example process 1300 performed, for example, by a base station, in accordance with the present disclosure. Example process 1300 is an example where the base station (e.g., base station 110) performs operations associated with PRTs for FD communication.

As shown in FIG. 13, in some aspects, process 1300 may include transmitting, to a UE, information indicating at least one of a first set of PRTs for uplink communication, or a second set of PRTs for downlink communication, for use in a full-duplex communication mode, where the first set of PRTs and the second set of PRTs share at least one PRT (block 1310). For example, the base station (e.g., using transmission component 1504) may transmit information indicating at least one of a first set of PRTs for uplink communication, or a second set of PRTs for downlink communication, for use in a full-duplex communication mode, as described above. In some aspects, the first set of PRTs and the second set of PRTs share at least one PRT.

As further shown in FIG. 13, in some aspects, process 1300 may include transmitting, to the UE, or receiving, from the UE, at least one signal based at least in part on the at least one of the first set of PRTs or the second set of PRTs (block 1320). For example, the base station (e.g., using transmit processor 220, TX MIMO processor 230, modulator 232, antenna 234, transmission component 1504, DEMOD 232, MIMO detector 236, receive processor 238, reception component 1502, controller/processor 240, memory 242, and/or scheduler 246) may transmit, to the UE, or receive, from the UE, at least one signal based at least in part on the at least one of the first set of PRTs or the second set of PRTs, as described above.

Process 1300 may include additional aspects, such as any single aspect or any combination of aspects described below and/or in connection with one or more other processes described elsewhere herein.

In a first aspect, the first set of PRTs include one or more PRTs in an uplink sub-band for the full-duplex communication mode, and the second set of PRTs include one or more PRTs in a downlink sub-band for the full-duplex communication mode.

In a second aspect, alone or in combination with the first aspect, the at least one PRT is in a guard band between an uplink sub-band and a downlink sub-band for the full-duplex communication mode.

In a third aspect, alone or in combination with one or more of the first and second aspects, an uplink sub-band and a downlink sub-band, for the full-duplex communication mode, frequency hop in a first time interval and a second time interval.

In a fourth aspect, alone or in combination with one or more of the first through third aspects, transmitting or receiving the at least one signal includes transmitting or receiving a first signal in the first time interval based at least in part on the at least one of the first set of PRTs or the second set of PRTs, and transmitting or receiving a second signal in the second time interval based at least in part on at least one of a third set of PRTs for uplink communication or a fourth set of PRTs for downlink communication, where the third set of PRTs is different from the first set of PRTs, and the fourth set of PRTs is different from the second set of PRTs.

In a fifth aspect, alone or in combination with one or more of the first through fourth aspects, the third set of PRTs is frequency shifted relative to the first set of PRTs, and the fourth set of PRTs is frequency shifted relative to the second set of PRTs; or the third set of PRTs is mirrored in frequency relative to the first set of PRTs with respect to a particular frequency, and the fourth set of PRTs is mirrored in frequency relative to the second set of PRTs with respect to the particular frequency.

In a sixth aspect, alone or in combination with one or more of the first through fifth aspects, the fourth set of PRTs for downlink communication are based at least in part on the first set of PRTs for uplink communication, and the third set of PRTs for uplink communication are based at least in part on the second set of PRTs for downlink communication.

In a seventh aspect, alone or in combination with one or more of the first through sixth aspects, transmitting or receiving the at least one signal includes receiving, in a half-duplex communication mode, an uplink signal based at least in part on the first set of PRTs, or transmitting, in a half-duplex communication mode, a downlink signal based at least in part on the second set of PRTs.

In an eighth aspect, alone or in combination with one or more of the first through seventh aspects, the uplink signal is received further based at least in part on a supplemental set of PRTs for uplink communication, or the downlink signal is transmitted further based at least in part on a supplemental set of PRTs for downlink communication.

In a ninth aspect, alone or in combination with one or more of the first through eighth aspects, transmitting or receiving the at least one signal includes receiving, in a half-duplex communication mode, an uplink signal based at least in part on the first set of PRTs and the second set of PRTs, or transmitting, in a half-duplex communication mode, a downlink signal based at least in part on the first set of PRTs and the second set of PRTs.

In a tenth aspect, alone or in combination with one or more of the first through ninth aspects, the first set of PRTs and the second set of PRTs are a same set of PRTs.

In an eleventh aspect, alone or in combination with one or more of the first through tenth aspects, the same set of PRTs is in resources that are shared for uplink communication and downlink communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
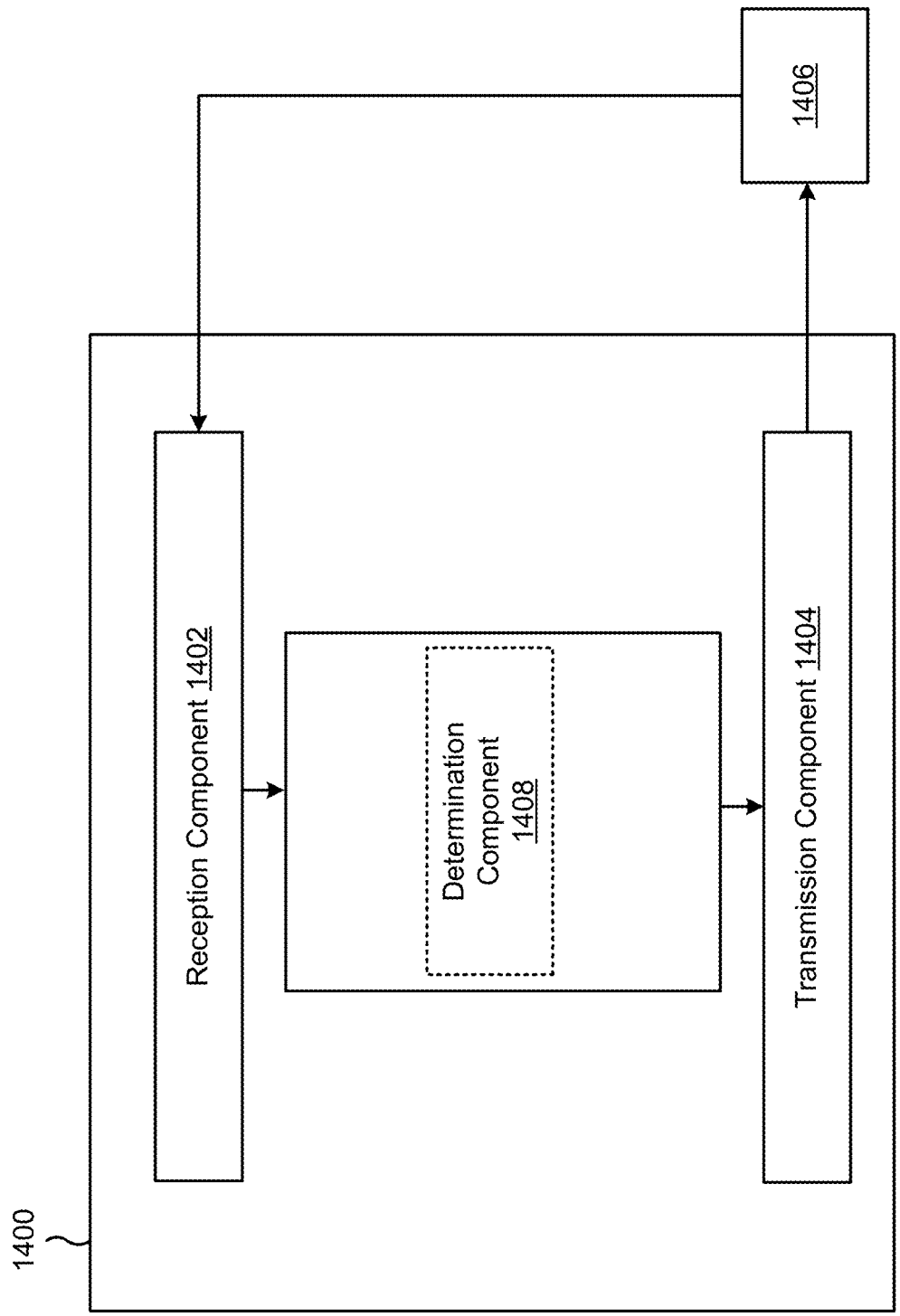
FIGS. 14 and 15 are block diagrams of example apparatuses for wireless communication, in accordance with the present disclosure.

FIG. 14 is a block diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 6-11. Additionally or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive (e.g., from a base station) information indicating at least one of a first set of PRTs for uplink communication, or a second set of PRTs for downlink communication, for use in a full-duplex communication mode. The determination component 1408 may determine at least one of a first set of PRTs for uplink communication, or a second set of PRTs for downlink communication, for use in a full-duplex communication mode. In some aspects, the first set of PRTs and the second set of PRTs share at least one PRT. In some aspects, the determination component 1408 may include a controller/processor, a memory, or a combination thereof, of the UE described above in connection with FIG. 2. The transmission component 1404 may transmit (e.g., to a base station) at least one signal based at least in part on the at least one of the first set of PRTs or the second set of PRTs. The reception component 1402 may receive (e.g., from a base station) at least one signal based at least in part on the at least one of the first set of PRTs or the second set of PRTs.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
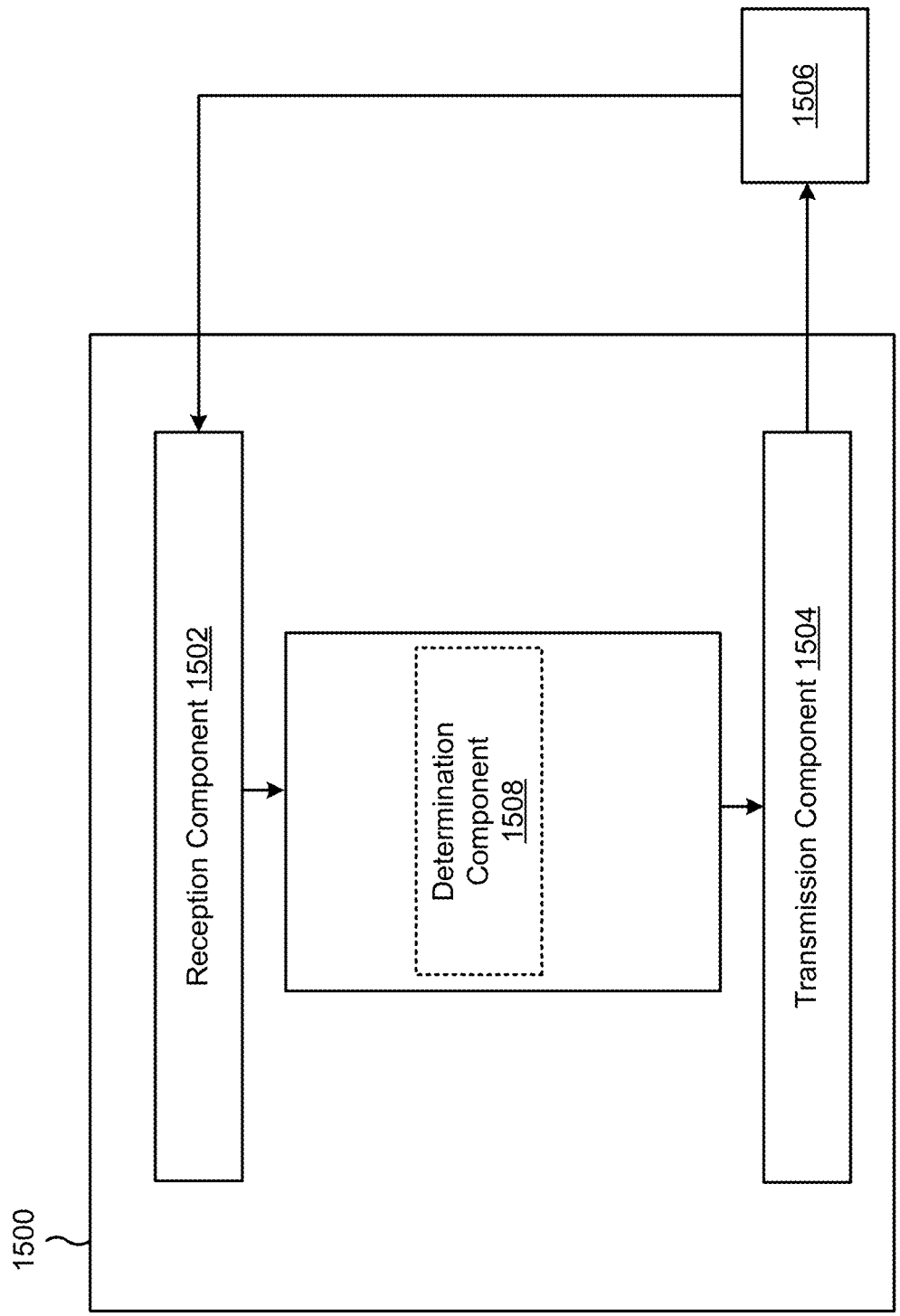

FIG. 15 is a block diagram of an example apparatus 1500 for wireless communication, in accordance with the present disclosure. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 6-11. Additionally or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit (e.g., to a UE) information indicating at least one of a first set of PRTs for uplink communication, or a second set of PRTs for downlink communication, for use in a full-duplex communication mode. The determination component 1508 may determine at least one of a first set of PRTs for uplink communication, or a second set of PRTs for downlink communication, for use in a full-duplex communication mode. In some aspects, the first set of PRTs and the second set of PRTs share at least one PRT. In some aspects, the determination component 1508 may include a controller/processor, a memory, or a combination thereof, of the base station described above in connection with FIG. 2. The transmission component 1504 may transmit (e.g., to a UE) at least one signal based at least in part on the at least one of the first set of PRTs or the second set of PRTs. The reception component 1502 may receive (e.g., from a UE) at least one signal based at least in part on the at least one of the first set of PRTs or the second set of PRTs.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving, from a base station, information indicating at least one of a first set of peak reduction tones (PRTs) for uplink communication, or a second set of PRTs for downlink communication, for use in a full-duplex communication mode, wherein the first set of PRTs and the second set of PRTs share at least one PRT; and transmitting, to the base station, or receiving, from the base station, at least one signal based at least in part on the at least one of the first set of PRTs or the second set of PRTs.

Aspect 2: The method of Aspect 1, wherein the first set of PRTs include one or more PRTs in an uplink sub-band for the full-duplex communication mode, and the second set of PRTs include one or more PRTs in a downlink sub-band for the full-duplex communication mode.

Aspect 3: The method of any of Aspects 1-2, wherein the at least one PRT is in a guard band between an uplink sub-band and a downlink sub-band for the full-duplex communication mode.

Aspect 4: The method of any of Aspects 1-3, wherein an uplink sub-band and a downlink sub-band, for the full-duplex communication mode, frequency hop in a first time interval and a second time interval.

Aspect 5: The method of Aspect 4, wherein transmitting or receiving the at least one signal comprises: transmitting or receiving a first signal in the first time interval based at least in part on the at least one of the first set of PRTs or the second set of PRTs; and transmitting or receiving a second signal in the second time interval based at least in part on at least one of a third set of PRTs for uplink communication or a fourth set of PRTs for downlink communication, wherein the third set of PRTs is different from the first set of PRTs, and the fourth set of PRTs is different from the second set of PRTs.

Aspect 6: The method of Aspect 5, wherein the third set of PRTs is frequency shifted relative to the first set of PRTs, and the fourth set of PRTs is frequency shifted relative to the second set of PRTs.

Aspect 7: The method of any of Aspects 5-6, wherein the third set of PRTs is mirrored in frequency relative to the first set of PRTs with respect to a particular frequency, and the fourth set of PRTs is mirrored in frequency relative to the second set of PRTs with respect to the particular frequency.

Aspect 8: The method of any of Aspects 5-7, wherein the fourth set of PRTs for downlink communication are based at least in part on the first set of PRTs for uplink communication, and the third set of PRTs for uplink communication are based at least in part on the second set of PRTs for downlink communication.

Aspect 9: The method of any of Aspects 1-8, wherein transmitting or receiving the at least one signal comprises: transmitting, in a half-duplex communication mode, an uplink signal based at least in part on the first set of PRTs, or receiving, in a half-duplex communication mode, a downlink signal based at least in part on the second set of PRTs.

Aspect 10: The method of Aspect 8, wherein the uplink signal is transmitted further based at least in part on a supplemental set of PRTs for uplink communication, or the downlink signal is received further based at least in part on a supplemental set of PRTs for downlink communication.

Aspect 11: The method of any of Aspects 1-10, wherein transmitting or receiving the at least one signal comprises: transmitting, in a half-duplex communication mode, an uplink signal based at least in part on the first set of PRTs and the second set of PRTs, or receiving, in a half-duplex communication mode, a downlink signal based at least in part on the first set of PRTs and the second set of PRTs.

Aspect 12: The method of any of Aspects 1-11, wherein the first set of PRTs and the second set of PRTs are a same set of PRTs.

Aspect 13: The method of Aspect 11, wherein the same set of PRTs is in resources that are shared for uplink communication and downlink communication.

Aspect 14: A method of wireless communication performed by a base station, comprising: transmitting, to a user equipment (UE), information indicating at least one of a first set of peak reduction tones (PRTs) for uplink communication, or a second set of PRTs for downlink communication, for use in a full-duplex communication mode, wherein the first set of PRTs and the second set of PRTs share at least one PRT; and transmitting, to the UE, or receiving, from the UE, at least one signal based at least in part on the at least one of the first set of PRTs or the second set of PRTs.

Aspect 15: The method of Aspect 14, wherein the first set of PRTs include one or more PRTs in an uplink sub-band for the full-duplex communication mode, and the second set of PRTs include one or more PRTs in a downlink sub-band for the full-duplex communication mode.

Aspect 16: The method of any of Aspects 14-15, wherein the at least one PRT is in a guard band between an uplink sub-band and a downlink sub-band for the full-duplex communication mode.

Aspect 17: The method of any of Aspects 14-16, wherein an uplink sub-band and a downlink sub-band, for the full-duplex communication mode, frequency hop in a first time interval and a second time interval.

Aspect 18: The method of Aspect 17, wherein transmitting or receiving the at least one signal comprises: transmitting or receiving a first signal in the first time interval based at least in part on the at least one of the first set of PRTs or the second set of PRTs; and transmitting or receiving a second signal in the second time interval based at least in part on at least one of a third set of PRTs for uplink communication or a fourth set of PRTs for downlink communication, wherein the third set of PRTs is different from the first set of PRTs, and the fourth set of PRTs is different from the second set of PRTs.

Aspect 19: The method of Aspect 18, wherein the third set of PRTs is frequency shifted relative to the first set of PRTs, and the fourth set of PRTs is frequency shifted relative to the second set of PRTs.

Aspect 20: The method of any of Aspects 18-19, wherein the third set of PRTs is mirrored in frequency relative to the first set of PRTs with respect to a particular frequency, and the fourth set of PRTs is mirrored in frequency relative to the second set of PRTs with respect to the particular frequency.

Aspect 21: The method of any of Aspects 18-20, wherein the fourth set of PRTs for downlink communication are based at least in part on the first set of PRTs for uplink communication, and the third set of PRTs for uplink communication are based at least in part on the second set of PRTs for downlink communication.

Aspect 22: The method of any of Aspects 14-21, wherein transmitting or receiving the at least one signal comprises: receiving, in a half-duplex communication mode, an uplink signal based at least in part on the first set of PRTs, or transmitting, in a half-duplex communication mode, a downlink signal based at least in part on the second set of PRTs.

Aspect 23: The method of Aspect 22, wherein the uplink signal is received further based at least in part on a supplemental set of PRTs for uplink communication, or the downlink signal is transmitted further based at least in part on a supplemental set of PRTs for downlink communication.

Aspect 24: The method of any of Aspects 14-23, wherein transmitting or receiving the at least one signal comprises: receiving, in a half-duplex communication mode, an uplink signal based at least in part on the first set of PRTs and the second set of PRTs, or transmitting, in a half-duplex communication mode, a downlink signal based at least in part on the first set of PRTs and the second set of PRTs.

Aspect 25: The method of any of Aspects 14-24, wherein the first set of PRTs and the second set of PRTs are a same set of PRTs.

Aspect 26: The method of Aspect 25, wherein the same set of PRTs is in resources that are shared for uplink communication and downlink communication.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
  receive, from a base station, information indicating a first set of peak reduction tones (PRTs) for uplink communication and a second set of PRTs for downlink communication, for use in a full-duplex communication mode,
   wherein the first set of PRTs and the second set of PRTs share at least one PRT; and
  transmit, to the base station, or receive, from the base station, at least one signal based at least in part on the first set of PRTs and the second set of PRTs.

2. The UE of claim 1, wherein the first set of PRTs include one or more PRTs in an uplink sub-band for the full-duplex communication mode, and the second set of PRTs include one or more PRTs in a downlink sub-band for the full-duplex communication mode.

3. The UE of claim 1, wherein the at least one PRT is in a guard band between an uplink sub-band and a downlink sub-band for the full-duplex communication mode.

4. The UE of claim 1, wherein an uplink sub-band and a downlink sub-band, for the full-duplex communication mode, frequency hop in a first time interval and a second time interval.

5. The UE of claim 4, wherein the one or more processors, to transmit or receive the at least one signal, are configured to:
  transmit or receive a first signal in the first time interval based at least in part on the first set of PRTs or the second set of PRTs; and
  transmit or receive a second signal in the second time interval based at least in part on at least one of a third set of PRTs for uplink communication or a fourth set of PRTs for downlink communication,
    wherein the third set of PRTs is different from the first set of PRTs, and the fourth set of PRTs is different from the second set of PRTs.

6. The UE of claim 5, wherein the third set of PRTs is frequency shifted relative to the first set of PRTs, and the fourth set of PRTs is frequency shifted relative to the second set of PRTs.

7. The UE of claim 5, wherein the third set of PRTs is mirrored in frequency relative to the first set of PRTs with respect to a particular frequency, and the fourth set of PRTs is mirrored in frequency relative to the second set of PRTs with respect to the particular frequency.

8. The UE of claim 5, wherein the fourth set of PRTs for downlink communication are based at least in part on the first set of PRTs for uplink communication, and the third set of PRTs for uplink communication are based at least in part on the second set of PRTs for downlink communication.

9. The UE of claim 1, wherein the one or more processors, to transmit or receive the at least one signal, are configured to:
  transmit, in a half-duplex communication mode, an uplink signal based at least in part on the first set of PRTs, or receive, in a half-duplex communication mode, a downlink signal based at least in part on the second set of PRTs.

10. The UE of claim 9, wherein the uplink signal is transmitted further based at least in part on a supplemental set of PRTs for uplink communication, or the downlink signal is received further based at least in part on a supplemental set of PRTs for downlink communication.

11. The UE of claim 1, wherein the one or more processors, to transmit or receive the at least one signal, are configured to:
  transmit, in a half-duplex communication mode, an uplink signal based at least in part on the first set of PRTs and the second set of PRTs, or receive, in a half-duplex communication mode, a downlink signal based at least in part on the first set of PRTs and the second set of PRTs.

12. The UE of claim 1, wherein the first set of PRTs and the second set of PRTs are a same set of PRTs.

13. The UE of claim 12, wherein the same set of PRTs is in resources that are shared for uplink communication and downlink communication.

14. A base station for wireless communication, comprising:
  a memory; and
  one or more processors, coupled to the memory, configured to:
    transmit, to a user equipment (UE), information indicating a first set of peak reduction tones (PRTs) for uplink communication, and a second set of PRTs for downlink communication, for use in a full-duplex communication mode,
      wherein the first set of PRTs and the second set of PRTs share at least one PRT; and
    transmit, to the UE, or receive, from the UE, at least one signal based at least in part on the first set of PRTs and the second set of PRTs.

15. The base station of claim 14, wherein the first set of PRTs include one or more PRTs in an uplink sub-band for the full-duplex communication mode, and the second set of PRTs include one or more PRTs in a downlink sub-band for the full-duplex communication mode.

16. The base station of claim 14, wherein the at least one PRT is in a guard band between an uplink sub-band and a downlink sub-band for the full-duplex communication mode.

17. The base station of claim 14, wherein an uplink sub-band and a downlink sub-band, for the full-duplex communication mode, frequency hop in a first time interval and a second time interval.

18. The base station of claim 17, wherein the one or more processors, to transmit or receive the at least one signal, are configured to:
  transmit or receive a first signal in the first time interval based at least in part on the first set of PRTs or the second set of PRTs; and
  transmit or receive a second signal in the second time interval based at least in part on at least one of a third set of PRTs for uplink communication or a fourth set of PRTs for downlink communication,
    wherein the third set of PRTs is different from the first set of PRTs, and the fourth set of PRTs is different from the second set of PRTs.

19. The base station of claim 18, wherein the third set of PRTs is frequency shifted relative to the first set of PRTs, and the fourth set of PRTs is frequency shifted relative to the second set of PRTs.

20. The base station of claim 18, wherein the third set of PRTs is mirrored in frequency relative to the first set of PRTs with respect to a particular frequency, and the fourth set of PRTs is mirrored in frequency relative to the second set of PRTs with respect to the particular frequency.

21. The base station of claim 18, wherein the fourth set of PRTs for downlink communication are based at least in part on the first set of PRTs for uplink communication, and the third set of PRTs for uplink communication are based at least in part on the second set of PRTs for downlink communication.

22. The base station of claim 14, wherein the one or more processors, to transmit or receive the at least one signal, are configured to:
  receive, in a half-duplex communication mode, an uplink signal based at least in part on the first set of PRTs, or transmit, in a half-duplex communication mode, a downlink signal based at least in part on the second set of PRTs.

23. The base station of claim 22, wherein the uplink signal is received further based at least in part on a supplemental set of PRTs for uplink communication, or the downlink signal is transmitted further based at least in part on a supplemental set of PRTs for downlink communication.

24. The base station of claim 14, wherein the one or more processors, to transmit or receive the at least one signal, are configured to:

receive, in a half-duplex communication mode, an uplink signal based at least in part on the first set of PRTs and the second set of PRTs, or transmit, in a half-duplex communication mode, a downlink signal based at least in part on the first set of PRTs and the second set of PRTs.

25. The base station of claim 14, wherein the first set of PRTs and the second set of PRTs are a same set of PRTs.

26. The base station of claim 25, wherein the same set of PRTs is in resources that are shared for uplink communication and downlink communication.

27. A method of wireless communication performed by a user equipment (UE), comprising:
    receiving, from a base station, information indicating a first set of peak reduction tones (PRTs) for uplink communication, and a second set of PRTs for downlink communication, for use in a full-duplex communication mode,
        wherein the first set of PRTs and the second set of PRTs share at least one PRT; and
    transmitting, to the base station, or receiving, from the base station, at least one signal based at least in part on the first set of PRTs and the second set of PRTs.

28. The method of claim 27, wherein the at least one PRT is in a guard band between an uplink sub-band and a downlink sub-band for the full-duplex communication mode.

29. A method of wireless communication performed by a base station, comprising:
    transmitting, to a user equipment (UE), information indicating a first set of peak reduction tones (PRTs) for uplink communication, and a second set of PRTs for downlink communication, for use in a full-duplex communication mode,
        wherein the first set of PRTs and the second set of PRTs share at least one PRT; and
    transmitting, to the UE, or receiving, from the UE, at least one signal based at least in part on the first set of PRTs and the second set of PRTs.

30. The method of claim 29, wherein the at least one PRT is in a guard band between an uplink sub-band and a downlink sub-band for the full-duplex communication mode.

* * * * *